United States Patent
Katz et al.

(10) Patent No.: US 9,377,867 B2
(45) Date of Patent: Jun. 28, 2016

(54) GESTURE BASED INTERFACE SYSTEM AND METHOD

(75) Inventors: Itay Katz, Tel Aviv (IL); Nadav Israel, Petach Tikva (IL); Tamir Anavi, Kfar Yona (IL); Shahaf Grofit, Tel Aviv (IL); Itay Bar-Yosef, Tel Aviv (IL)

(73) Assignee: EYESIGHT MOBILE TECHNOLOGIES LTD., Herzliya (IL)

( * ) Notice: Subject to any disclaimer, the term of this patent is extended or adjusted under 35 U.S.C. 154(b) by 91 days.

(21) Appl. No.: 14/237,834

(22) PCT Filed: Aug. 8, 2012

(86) PCT No.: PCT/IL2012/050297
§ 371 (c)(1),
(2), (4) Date: Apr. 16, 2014

(87) PCT Pub. No.: WO2013/021385
PCT Pub. Date: Feb. 14, 2013

(65) Prior Publication Data
US 2014/0306877 A1 Oct. 16, 2014

Related U.S. Application Data

(60) Provisional application No. 61/522,288, filed on Aug. 11, 2011, provisional application No. 61/522,283, filed on Aug. 11, 2011, provisional application No. 61/522,285, filed on Aug. 11, 2011, provisional application No. 61/536,701, filed on Sep. 20, 2011, provisional application No. 61/537,818, filed on Sep. 22, 2011, provisional application No. 61/539,729, filed on Sep. 27, 2011.

(51) Int. Cl.
*G06F 3/01* (2006.01)
*G06F 3/03* (2006.01)
*G06F 1/16* (2006.01)

(52) U.S. Cl.
CPC ............. *G06F 3/017* (2013.01); *G06F 1/1694* (2013.01); *G06F 3/0304* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 9,176,608 B1 * | 11/2015 | Baldwin | G09G 5/00 |
| 2005/0286743 A1 * | 12/2005 | Kurzweil | G10L 13/00 382/114 |
| 2011/0173574 A1 * | 7/2011 | Clavin et al. | 715/863 |

FOREIGN PATENT DOCUMENTS

| | | |
|---|---|---|
| WO | WO 2008/068557 A2 | 6/2008 |
| WO | WO 2011/066343 A2 | 6/2011 |
| WO | WO 2011/069148 A1 | 6/2011 |

OTHER PUBLICATIONS

International Search Report for PCT International Application No. PCT/IL2012/050297, mailed Aug. 19, 2013 (8 pages).

*Primary Examiner* — Joseph Haley
*Assistant Examiner* — Emily Frank
(74) *Attorney, Agent, or Firm* — Finnegan, Henderson, Farabow, Garrett & Dunner LLP

(57) ABSTRACT

A user interface apparatus for controlling any kind of a device. Images obtained by an image sensor in a region adjacent to the device are input to a gesture recognition system which analyzes images obtained by the image sensor to identify one or more gestures. A message decision maker generates a message based upon an identified gesture and a recognition mode of the gesture recognition system. The recognition mode is changed under one or more various conditions.

25 Claims, 13 Drawing Sheets

GESTURE BASED INTERFACE SYSTEM AND METHOD

This application is a U.S. national stage of PCT International Application No. PCT/IL2012/050297, filed Aug. 8, 2012, which claims the benefit of U.S. Provisional Application No. 61/522,288, filed Aug. 11, 2011, U.S. Provisional Application No. 61/522,283, filed Aug. 11, 2011, U.S. Provisional Application No. 61/522,285, filed Aug. 11, 2011, U.S. Provisional Application No. 61/536,701, filed Sep. 20, 2011, U.S. Provisional Application No. 61/537,818, filed Sep. 22, 2011, and U.S. Provisional Application No. 61/539,729, filed Sep. 27, 2011, the contents of all of which are incorporated herein by reference in their entirety.

TECHNOLOGICAL FIELD

This invention relates to image analysis and object tracking.

BACKGROUND

The following publications are considered to be relevant for an understanding of the background of the invention:
U.S. Pat. No. 6,252,598;
U.S. Pat. No. 8,166,421 to Magal et al;
WO2005/091125;
WO 2010/086866;
Viola, P et al, Robust Real-time Object Detection, Second International Workshop on Statistical and Computational theories of Vision-Modeling, learning, Computing, and Sampling, Vancouver Canada, Jul. 13, 2001.

Various types of computer control and interface devices exist for inputting commands to a computer. Such devices may for example take the form of a computer mouse, joystick or trackball, wherein a user manipulates the interface device to perform a particular operation such as to select a specific entry from a menu of options, perform a "click" or "point" function, etc. These interface devices require a surface area for placement of the device and, in the case of a mouse, to accommodate device movement and manipulation. In addition, such interface devices are generally connected by a cable to the computer with the cable typically draped across the user's desk, causing obstruction of the user's work area. Manipulation of these interface devices for performing operations is not consistent with common communication gestures, such as the use of a pointing finger hand gesture to select a menu entry, as opposed to maneuvering a mouse until the cursor rests on the desired menu entry.

Attempts have been made to implement hand gesture recognition using optical sensors for use in inputting commands to a device. Gesture recognition requires identifying a body part, typically a hand, in each of a plurality of imagers in a video stream.

For example, it is known to identify hand gestures in a video stream. A plurality of regions in a frame are defined and screened to locate a hand in one of the regions by locating extreme curvature values, such as peaks and valleys, corresponding to predefined hand positions and gestures. The number of peaks and valleys are then used to identify and correlate a predefined hand gesture to the hand image for effectuating a particular computer operation or function.

Systems are also known in which three-dimensional position information is used to identify a gesture created by a body part. At one or more instances of an interval, the posture of a body part is recognized, based on the shape of the body part and its position and orientation. The posture of the body part over each of the one or more instances in the interval is recognized as a combined gesture. The gesture is classified for determining an input into a related electronic device.

User interface methods are also known in which a sequence of depth maps is captured over time of at least a part of a body of a human subject. The depth maps are processed in order to detect a direction and speed of movement of the part of the body as the part of the body passes through an interaction surface. A computer application is controlled responsively to the detected direction and speed.

GENERAL DESCRIPTION

The present invention provides a user interface apparatus for controlling a device such as a personal computer (PC), a portable computer, a PDA, a laptop, a mobile telephone, a radio, a digital camera, a vehicle, a medical device, a smart home appliance such as a television or home entertainment system, a mobile game machine or a home appliance.

The user interface apparatus of the invention comprises an image sensor. Images obtained by the image sensor in a region adjacent to the device are input to a gesture recognition system which analyzes images obtained by the image sensor to identify one or more gestures from among one or more gestures to be identified performed by a predefined object such as a hand or finger. Detection of a gesture is input to a message decision maker which generates a message based upon the identified gesture and the present recognition mode of the gesture recognition system. The message may be addressed, for example, to the device, an operating system of the first device, one or more applications running on a processor of the first device, a software program running in the background and one or more services running on the first device or, a process running in the device, on an external network.

The gesture recognition system runs a gesture recognition module which operates in each of two or more recognition modes. The recognition mode is determined by the gesture mode decision maker which is configured to change the recognition mode from an initial recognition mode to a second recognition mode, under one or more various conditions, as explained below.

The second recognition mode is determined based upon any one or more of the initial recognition mode of the gesture recognition, a gesture identified by the gesture recognition system and situational awareness information. The term "situational awareness information" is used herein to refer to information related to any one or more of a state of the first device, information obtained by one or more sensors associated with the interface system, information obtained by one or more first device sensors associated with the first device, information related to one or more processes running on the device, information related to applications running on the device, information related to a power condition of the device, information related to a notification of the device, information related to movement of the device, information related to a spatial orientation of the device, information relating to an interaction with one or more users information relating to user behavior and information relating to one or more triggers.

The invention thus provides an interface system for controlling a first device, the interface system being a computer program product containing instructions for causing a processor to perform a method comprising:
(a) receiving input from one or more image sensors;
(b) in a gesture recognition module of the interface system, the gesture recognition module having two or more recognition modes:
  (i) analyzing images obtained by the image sensor to detect one or more gestures to be detected performed by a predefined object selected from one or more hands, a part of a hand, one or more fingers, one or more parts of a finger, and one or more fingertips; and
  (ii) changing the recognition mode of the gesture recognition module from an initial recognition mode to a second recognition mode under any one or more predefined conditions, wherein the second recognition mode is determined based upon any one or more of the initial recognition mode of the gesture recognition module, and an detected gesture, and situational awareness information of the device, wherein the situational awareness information is one or more of information related to a state of the device, information received by a sensor associated with the device, information related to one or more processes running on the device, information related to applications running on the device, information related to a power condition of the device, information related to a notification of the device, information related to movement of the device, information related to a spatial orientation of the device, information relating to an interaction with one or more users information relating to user behavior and information relating to one or more triggers.
  (iii) generate a first message wherein the generated first message is determined based upon the initial recognition mode of the gesture recognition module and an detected gesture.

In the interface system of the invention, the gesture recognition module may be further configured to analyze signals generated by one or more sensors, and the gestures to be detected depend on the analysis of the sensor signals. One or more of the recognition modes of the gesture recognition module may be defined by:
(a) the one or more predefined gestures to be detected, the message for each of one or more predefined gestures to be detected, and the one or more algorithms that are active on the gesture recognition module; and
(b) any one or more of the second recognition mode for each of one or more predefined gestures to be detected, a resolution of images captured by the image sensor and a capture rate of images captured by the image sensor.

In the interface of the invention, the interface system may have two or more interface modes, and each interface mode depends on the recognition mode of the gesture recognition module and one or more active sensors from a predefined set of sensors providing informational awareness information to the gesture recognition module. Each interface mode may determine one or more signals from one or more sensors to be analyzed by the gesture recognition module. The interface modes may depend on one or both of the situational awareness information and the first message. A change in the interface mode may generate a third message to one or more of the first device, an application running on the first device, a service running on the first device, and an operating system running on the first device. The third message may include a command to any one or more of the first device, an application running on the first device, a service running on the first device, and an operating system running on the first device, to provide an indication on any one or more of the interface mode, the mode of the gesture recognition module, and the gestures to be detected.

In the interface system of the invention, the first message may include a command to any one or more of the first device, an application running on the first device, a service running on the first device, and an operating system running on the first device, to provide an indication that gesture was recognized and or which gesture was recognized. The indication may be a visual indication, an audio indication, a tactile indication, an ultrasonic indication, a haptic indication. The indication may be a visual indication in a form selected from an icon displayed on a display screen, a change in an icon on a display screen, a change in color of an icon on a display screen, an indication light, an indicator moving on a display screen, a directional vibration indication, an air tactile indication. The indication may be provided by an indicator moving on a display screen and the indicator appears on top of all other images or video appearing on the display screen. The indication may depend on the situational awareness information.

In the interface system of the invention, the situational awareness information may be information related to one or more triggers selected from a change in user interface of an application, a change in a visual appearance of an application, a change in mode of an application, a change in state of an application, an event occurring in software running on the first device, a change in behavior of an application, a notification received via a network, an online service notification, a notification generated by the device or an application or by a service, from a touch on a touch screen, a pressing of a virtual or real button, a sound received by a microphone connected to the device, detection of a user holding the first device, a signal from a proximity sensor, an incoming voice or video call via a cellular network, a wireless network, TCPIP, or a wired network, an incoming 3D video call, a text message notification, a notification of a meeting, a community network based communication, a Skype notification, a facebook notification, a twitter notification, an on-line service notification, a missed call notification, an email notification, a voice mail notification, a device notification, a beginning or an end of a song on a player, a beginning or an end of a video.

In the interface system of the invention, the situational awareness information may be information related to one or more triggers selected from a gesture, passing an object over the first device at a distance less than a predefined distance, detection of a user looking at the first device, detection of a face in an image obtained by the image sensor, detection of one or more eyes in an image obtained by the image sensor, detection of one or more hands or portions of a hand in an image obtained by the image sensor, and detection of a predefined individual looking at the first device.

In the interface system of the invention, one or more of the gestures to be detected may be selected from a swiping motion, a pinching motion of two fingers, pointing, a left to right gesture, a right to left gesture, an upwards gesture, a downwards gesture, a pushing gesture, opening a clenched fist, opening a clenched fist and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an activatable object, holding an activating object for a predefined amount of time, clicking on an activatable object, double clicking on an activatable object, clicking from the right side on an activatable object, clicking from the left side on an activatable object, clicking from the bottom on an activatable object, clicking from the top on an activatable object, grasping an activatable object the object, gesturing towards an activatable object the object from the right, gesturing towards an activatable object from the left, passing through an activatable object from the left, pushing the object, clapping, waving over an activatable object, performing a blast gesture, performing a tapping gesture, performing a clockwise or counter clockwise gesture over an activatable object, grasping an activatable object with two fingers, performing a click-drag-release motion, sliding an icon.

In the interface system of the invention, the first message may be addressed to any one or more of the first device, an operating system of the first device, one or more applications running on a processor of the device, and one or more services running on the device or on an external network. The first message may be addressed to the first device and in response to the first message the first device generates a second message to any one or more of a remote device, an operating system running on a remote device, one or more remote applications, and one or more remote services.

In the interface system of the invention, the situational awareness information may be related to a state of the first device and the first message is addressed to the first device and receipt of the first message at the first device results in a change in state of the first device.

In the interface system of the invention, the first message may be a command.

In the interface system of the invention, the second message may be a command. The first message may be a command selected from a command to run an application on the first device, a command to stop an application running on the first device, a command to activate a service running on the first device, a command to stop a service running on the first device. The first message may be a command to the first device selected from depressing a virtual key displayed on a display screen of the first device; rotating a selection carousel; switching between desktops, running on the first device a predefined software application; turning off an application on the first device; turning speakers on or off; turning volume up or down; locking the first device, unlocking the first device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, controlling interactive video or animated content, editing video or images, pointing at a map, zooming-in or out on a map or images, painting on an image, pushing an icon towards a display on the first device, grasping an icon and pulling the icon out form the display device, rotating an icon, emulating touch commands on the first device, performing one or more multi-touch commands, a touch gesture command, typing, clicking on a displayed video to pause or play, editing video or music commands, tagging a frame or capturing a frame from the video, cutting a subset of a video from a video, presenting an incoming message; answering an incoming call, silencing or rejecting an incoming call, opening an incoming reminder; presenting a notification received from a network community service; presenting a notification generated by the first device, opening a predefined application, changing the first device from a locked mode and opening a recent call application, changing the first device from a locked mode and opening an online service application or browser, changing the first device from a locked mode and opening an email application, changing the first device from locked mode and opening an online service application or browser, changing the device from a locked mode and opening a calendar application, changing the device from a locked mode and opening a reminder application, changing the device from a locked mode and opening a predefined application set by a user, set by a manufacturer of the first device, or set by a service operator, activating an icon, selecting a menu item, moving a pointer on a display, manipulating a touch free mouse, an icon on a display, altering information on a display.

In the interface system of the invention, the gesture recognition module In the interface system of the invention, further configured to generate a fourth message when the mode of the gesture recognition module is changed from the initial mode to the second mode. The fourth message may include a command to any one or more of the first device an application running on the first device, a service running on the first device, and an operating system running on the first device, to provide an indication of any one or more of the interface system is ready to recognize gestures, the interface system is ready to recognize one or more predefined gestures, the interface system is not ready to recognize gestures, ambient light conditions do not permit gesture recognition, system not ready to recognize gestures. The indication may be a visual indication, an audio indication, a tactile indication, a haptic indication. The indication may be a visual indication in a form selected from an icon displayed on a display screen, a change in an icon on a display screen, a change in color of an icon on a display screen, an indication light.

In the interface system of the invention, the initial mode and the second mode may be defined by at least a capture rate of images captured by the image sensor and the capture rate of the second mode is greater than the capture rate of the initial mode.

In the interface system of the invention, the initial mode and the second mode may be defined by at least a capture rate of images captured by the image sensor, and the capture rate of the second mode is less than the capture rate of the initial mode.

In the interface system of the invention, the initial mode and the second mode may be defined by at least a resolution of images captured by the image sensor, and the resolution of images of the second mode is greater than the resolution of images of the initial mode.

In the interface system of the invention, the initial mode and the second mode may be defined by at least a resolution of images of images captured by the image sensor, and the resolution of images of the second mode is less than the resolution of images of the initial mode.

In the interface system of the invention, in the initial mode the gesture recognition module may detect a hand and in the second mode the gesture recognition module may detect a finger, and a predefined condition is detection of a hand in an image.

In the interface system of the invention, the gesture recognition module may be further configured to change the mode from the second mode back to the initial mode after a predefined amount of time has elapsed or after a predefined amount of time has elapsed since a gesture was detected.

In the interface system of the invention, the situational awareness information may be information related to a state of the first device and the state of the first device is determined by any one or more of a state of a sensor, an operational state of a software application, a process running in the device, a service running in the device, a software program running in the foreground, one or more software programs running in the background, a network connected state of the device, a power state of the device, a light intensity of the screen of the device.

In the interface system of the invention, the second mode and the first message may further depend upon input from one or more sensors.

In the interface system of the invention, the interface system may be run by the first as a program on one or more processors of the device.

In the interface system of the invention, one or more processors of the first device may be selected from a dedicated processor, a general purpose processor, a DSP (digital signaling processor) processor, a GPU (graphical processing unit) processor, dedicated hardware, or a processor that can run on an external device. Any one or more of the sensors may be integral with the device. Any one or more of the sensors may be selected from a camera, a CMOS image sensor, a light sensor, an ultrasonic sensor, proximity sensor, pressure sensor, conductivity sensor, motion sensor, temperature sensor, accelerometer, gyroscope, orientation sensor, magnetic sensor, gravity sensor, and a reflectivity sensor a conductivity sensor and capacitance sensor and an image sensor.

In the interface system of the invention, the image sensor is selected from a camera, a light sensor, an IR sensor, an ultrasonic sensor, a proximity sensor, and a reflectivity sensor.

In the interface system of the invention, the first message generated by the gesture interface system may be addressed to an application running on the first device or to a remote application and the first message is interpreted by a first running application on the device in a first manner and a first message is interpreted by a second running application on the device in a second manner.

In the interface system of the invention, a trigger may be detection of a first object in an image obtained by the image sensor and in the second recognition mode the gesture recognition module identifies a second object in an image obtained by the image sensor and including the first object, the second object having a predefined spatial relationship to the first object, a predefined condition is detection of the first object in an image. The interface system may further comprise detecting a gesture performed by the second object. The first object may be a first body part and the second object may be a second body part. One or both of the first body part and the second body part may be selected from a face, one or two eyes, a first hand or a portion of a first hand, a first hand in a first pose. The second body part may be a second hand or a portion of a second hand, or a second hand in a second pose. The predefined spatial arrangement between the first and second objects may be specified by a vector from a center of gravity of the first object to a center of gravity of the second object, the vector having one or both of a magnitude in a predefined range and an direction in a predefined range.

In the interface system of the invention, the first object may be a first body part and the second object is a second body part, and detecting the second body part in an image may comprise:
(a) constructing a first rectangle surrounding the first body part, the first rectangle having a center, a height and a width;
(b) constructing a region of interest (ROI) in the image, the ROI being a second rectangle in the image obtained by a predefined transformation of the first rectangle;
(c) constructing a histogram f(v) of an attribute V of the pixels in the first rectangle, where f(v) is the frequency of the pixels in the first rectangle for which the value of the attribute V is v;
(d) constructing a histogram g(v) of the attribute V of the pixels in the ROI;
(e) calculating a probability P(x) in a calculation involving the value v(x) of the attribute V at the pixel x and the histograms f(v) and g(v); and
(f) detecting the second body part in the image in a calculation involving the probabilities P(x).

The first body part may be a face and the step of constructing a face rectangle around the face may be performed by a Viola and Jones (VJ) method. The ROI may be a rectangle having a center wherein the center of the ROI rectangle is offset from the center of the first rectangle by a predefined vector. The ROI rectangle may have a height that is a first predefined factor times the height of the first rectangle and a width that is a second predefined factor times the width of the first rectangle. P(x) may be proportional to $f(v(x))/g(v(x))$. Those pixels x having a probability P(x) above a predefined threshold may be determined to be pixels belonging to the second body part.

In the interface system of the invention, the gesture recognition module may be further configured to perform zooming-in and zooming-out of an image, in a method comprising:
(a) detecting, as an indication of a command to enter a zooming mode, one of a gesture comprising a change in separation of a forefinger and a thumb, and a predefined first gesture and pointing on the image or video at a point in the image or video that is to serve as a center for zooming;
(b) detecting a forefinger of a hand separated from a thumb of the hand by a first distance;
(c) detecting a change in the separation of the forefinger and thumb to a second distance, the second distance being less than the first distance being indicative of a command to enter a first zooming mode and to perform zooming in accordance with the first zooming mode, the first zooming mode being a zoom-in mode or a zoom-out mode, and the second distance being greater than the first distance being indicative of a command to enter a second zooming mode and to perform zooming in accordance with the second zooming mode, the second zooming mode being a zoom-in mode or a zoom-out mode and the second zooming mode being different from the first zooming mode;
(d) detecting one or more instances of a change in the separation of the forefinger and thumb,
(e) performing zooming according to the zooming mode during each instance of the change in the separation of the forefinger and thumb.

The gesture recognition module may be configured to perform zooming-in and zooming-out in a method comprising:
(a) detecting, as an indication of a command to enter a zooming mode; one of a gesture comprising a change in separation of a forefinger and a thumb, a predefined first gesture, and pointing on the image or video at a point in the image or video that is to serve as a center for zooming;
(b) detecting an extended finger in a initial orientation;
(c) detecting a change in the orientation of the forefinger in a first direction or a second direction, from the initial orientation to a second orientation, the first direction being indicative of a command to enter a first zooming mode and to perform zooming in accordance with the first zooming mode, the first zooming mode being a zoom-in mode or a zoom-out mode, and the second direction being indicative of a command to enter a second zooming mode and to perform zooming in accordance with the second zooming mode, the second zooming mode being a zoom-in mode or a zoom-out mode and the second zooming mode being different from the first zooming mode;
(d) detecting one or more instances of a change in the extended forefinger from the first orientation to the second orientation;

(e) performing zooming according to the zooming mode during each instance of the change in the orientation of the extended forefinger from the initial orientation to the second orientation, or performing zooming according to the zooming mode as long as the extended forefinger remains in the second orientation, the zooming having a zooming rate that increases with increasing distance between a tip of the finger in the initial orientation and the tip of the finger in the second orientation.

The gesture recognition module may be configured to perform zooming-in and zooming-out in a method comprising:

(a) detecting a first gesture or a second gesture, wherein the first gesture comprises moving a hand with splayed apart fingers towards the imaging device while closing the fingers and then moving the hand away from the imaging device and wherein the second gesture comprises moving a hand with closed fingers towards the imaging device while splaying the fingers apart and then moving the hand away from the imaging device;

(b) entering a first zooming mode when the first gesture is detected and entering a second zooming mode when the second gesture is detected, and performing zooming according to the zooming mode, the first zooming mode being a zoom-in mode or a zoom-out mode, and, the second zooming mode being a zoom-in mode or a zoom-out mode and the second zooming mode being different from the first zooming mode;

(c) performing zooming according to the zooming mode as long as the first or second gesture continues to be detected.

Pointing at a point on the screen may be indicative of a command to enter the zooming mode, and the point on the screen is a center for zooming in the zooming mode.

In the interface system of the invention, detecting gesture performed by the predefined object may comprise tracking the predefined object in a video stream $I_1, \ldots, I_k, \ldots I_n$ of images obtained by the image sensor by a method comprising:

(a) calculating an average image A of the input video stream and a standard deviation image STD of the video stream;

(b) calculating a normalized image In' of the last image In in the video stream;

(c) calculating a transformed image T(x) in a process involving the normalized image;

(d) constructing a weighted histogram of the values of the image T(x);

(e) setting the value of an index j to 1;

(f) calculating a binarized image B from the image T(x), where pixels of the image T(x) having a value above the jth threshold value are assigned the value 1 in the binarized image B, and pixels of the image T(x) having a value below the threshold are assigned the value 0 in the binarized image B;

(g) calculating two eigenvalues of the binarized image B;

(h) constructing an ellipse having first and second semi-axis lengths equal to the first and second eigenvalue, respectively;

(i) determining whether the constructed ellipse is similar in shape to an image of the object being tracked;

(j) if the constructed ellipse is similar in shape to an image of the object being tracked concluding that the object has been detected in the image I(x)n and that motion of the object in the video stream has been detected, and terminating the method;

(k) if the constructed ellipse is not similar in shape to the shape of the object, increasing the value of the index j by 1;

(l) if j exceeds a predefined jmax, concluding that the object has not been detected in the image In and motion of the object has not been detected in the video stream, and terminating the method; and (m) if j does not exceed jmax, returning to step (e).

In the interface system of the invention, the predefined object may be detected in an image obtained by the image sensor in a method comprising:

(a) segmenting the image into an integer N of initial segments, each segment having an associated feature vector (b) generating a final list of segments and the feature vector of each segment in the final list of segments, the final list of segments comprising the segments present in the initial list of segments together with additional segments formed by combining one or more neighboring segments into a common segment; and (c) clustering the segments in the final segment list into m of clusters of segments.

The step of generating a final list of segments may comprise:

(a) Forming a current list of segments comprising the initial segments $S1, \ldots, Sk, \ldots, SN$ in the image;

(b) setting an index i to N, the number of segments in the image;

(c) for each pair of neighboring segments Sk1 and Sk2 in the image calculating the distance between the feature vectors of the two segments, Vk1 and Vk2 using a predefined metric;

(d) finding a pair of neighboring segments Sk1 and Sk2 for which the distance $\|Vk1-Vk2\|$ is minimal among the pairs of neighboring segments;

(e) resegmenting the image by combining the two segments Sk1 and Sk2 into a single segment to reduce the number of segments by 1;

(f) Adding the combined segment Sk1 and Sk2 to the current list of segments, so as to update the current list of segments;

(g) calculating the feature vector of the combined segment;

(h) decreasing the index i is decreased by 1, (i) if i is greater than 1, returning to step (d), and (j) if i=1 terminating the step of generating a final list of segments.

The step of clustering the segments in the final segment list into m of clusters of segments may comprise:

(a) forming a current list of segments comprising the final list of segments $S'1, \ldots, S'k, \ldots, S'N'$;

(b) setting, an index i to N', the number of segments in the current list of segments;

(c) for each pair of segments Sk1 and Sk2 on the current list of segments, calculating the distance between the feature vector of the two segments, Vk1 and Vk2 using a predefined metric;

(d) finding a pair of segments Sk1 and Sk2 on the current list of segments for which the distance $\|Vk1-Vk2\|$ is minimal among the pairs of segments on the current list;

(e) Adding the combined segment Sk1 and Sk2 to the list of segments, so as to update the list of segments;

(f) calculating the feature vector of the combined segment;

(g) decreasing the index i by 1;

(h) if i is greater than m, returning to step (c); and (i) if i=m, terminating the step of clustering the segments in the final segment list.

The gesture recognition module may be further configured to perform an object validation procedure on a video sequence $I_1, I_2, \ldots I_k, I_{k+1}, I_n$ in which the predefined object has been detected by an object detection algorithm, the procedure comprising:

(a) generating two or more sequences S of objects, $O_1$, $O_2, \ldots O_k, O_{k+1}, \ldots O_n$ where the object $O_k$ in the sequence S has been detected by the object detection algorithm as being the predefined object;
(b) for each generated sequence of images,
  (i) for each pair of consecutive objects $O_k$, $O_{k+1}$ in the sequence, calculating a distance between the objects $O_k$, and $O_{k+1}$, $d_1(O_k, O_{k+1})$ using a first metric $d_1$;
  (ii) for each object $O_k$ in the sequence, calculating a distance $d_2(O_k, O)$ between the object $O_k$ and a standard image O of the predefined object using a second metric $d_2$.
  (iii) Calculating a length L of the sequence S, the length of the sequence L(S) being given by $$L(S) = \sum_{k=1}^{n} (d_1(O_k, O_{k+1}) + d_2(O_k, O))$$

(c) detecting sequences satisfying a predefined criterion; and
(d) detecting sequences not satisfying the predefined criterion as sequences containing one or more objects that were mistakenly detected by the object recognition algorithm as being the predefined object.

According to the predefined criterion, sequences whose length is below a predefined length may be detected as being composed of the predefined object, and sequences whose length is above the predefined threshold are detected as sequences containing one or more objects that were mistakenly detected by the object recognition algorithm as being the predefined object. Alternatively, according to the predefined criterion, a predefined fraction of shortest sequences, out of the total number of sequences are detected as being composed of the predefined object.

In the interface system of the invention, the gesture recognition module may be further configured to:
(a) detect one or more first gestures performed by the predefined object, each first gesture having an associated direction; and
(b) when a first gesture is detected, generate a first message based upon the detected first gesture;
(c) detect a second gesture, the second gesture having an associated direction different from the direction associated with the detected first gesture;
(d) generating a second message wherein the second message is determined based upon the detected second message when the second message is detected after a predefined time interval after termination of the first gesture; and
(e) not generating a second message when the second gesture is detected before the predefined time interval after termination of the first gesture.

The invention also provides a user interface apparatus for controlling a first device comprising:
(a) an image sensor;
(b) a gesture recognition system having two or more recognition modes configured to:
  (i) analyze images obtained by the image sensor to identify one or more gestures to be identified performed by a predefined object selected from one or more hands, a part of a hand, one or more fingers, one or more parts of a finger, and one or more fingertips; and
  (ii) change the recognition mode of the gesture recognition system from an initial recognition mode to a second recognition mode, wherein the second recognition mode is determined based upon any one or more of the initial recognition mode of the gesture recognition system, and an identified gesture, and situational awareness information of the device, wherein the situational awareness information is one or more of information related to a state of the device, information received by a sensor associated with the device, information related to one or more processes running on the device, information related to applications running on the device, information related to a power condition of the device, information related to a notification of the device, information related to movement of the device, information related to a spatial orientation of the device, information relating to an interaction with one or more users information relating to user behavior and information relating to one or more triggers.
  (iii) generate a first message wherein the generated first message is determined based upon the initial recognition mode of the gesture recognition system and an identified gesture.

In the interface system of the invention, the interface system may be integral with the first device.

A given gesture may serve multiple functions depending on context, such as software running on a processor, a detected trigger, or situational awareness based on audio or camera input. Thus, as applications (apps) change, the same gestures may serve differing functions.

Thus, the invention provides a computer program product containing instructions for causing a processor to perform a method comprising:
  receiving an input from an image sensor associated with a device, the input being indicative of a gesture by a human;
  processing situational awareness information reflective of a condition of the device, the processing of the situational awareness information including receiving the situational awareness information by a processor, storing the situational awareness information in a memory related to the processor, processing the situational awareness information, and generating an instruction related to the condition of the device;
  correlating the condition of the device with the received input, such that when the device is in a first condition, the received input results in control of the device in a first manner, and when the device is in a second condition, the received input results in control of the device in a second manner, different from the first manner;
  includes receiving the situational awareness information by a processor, storing the situational awareness information in a memory related to the processor, applying a situational awareness algorithm to the situational awareness information to generate transformed situational awareness information, and providing the transformed situational awareness to a processor that correlates the condition of the device with the received input.

The sensor associated with the device may include one of a camera, light sensor, ultrasonic sensor, proximity sensor, pressure sensor, conductivity sensor, motion sensor, temperature sensor, and reflectivity sensor.

The image sensor may include one of a camera, light sensor, ultrasonic sensor, proximity sensor, and reflectivity sensor.

The condition of the device may include an indication of one of a plurality of software programs-running on the device; and wherein during correlating, the input is used to control the first software application when the first software program is currently running on the device; and wherein the input is used to control the second software program.

The process may further include activating a state of the device correlated to at least one of an application running in the foreground of the device, an application running in the background of the device, or an application of the device that is not currently running on the device.

The condition of the device may be an environmental condition determined via at least one sensor.

The environmental condition may include at least one of a sound, a camera input, and a temperature.

The condition of the device may be an operational state of a software application.

The process may further comprise determining which of a first software program and a second software program are currently running on the processor, and based on the determining, conveying an associated command.

The first command and the second command may be the same and the first software program may be configured to interpret the command in order to control the first software program in the first manner, and the second software program may be configured to interpret the command in order to control the second software program in the second manner.

The situational awareness information may be one or more of information related to state of the device, information received by a sensor associated with the device, information related to processes running on the device, information related to applications running on the device, information related to a power condition of the device, and information related to a notification of the device.

Some algorithms work better when detecting gestures close to a camera, and other algorithms work better when gestures occur more remote from a camera. By switching gesture recognition mechanisms based on distance from the camera, the effectiveness of gesture detection may be optimized.

Thus, the invention provides a computer program product containing instructions for causing a processor to perform a method comprising:
receiving image information from an image sensor, the image information being indicative of a hand gesture;
classifying the gesture as one of a short-range gesture and a long-range gesture based on probability that the gesture occurred within a predefined distance between the gesture and the camera;
applying a first gesture recognition process to the image information if the gesture is classified as a short-range gesture; and
applying a second gesture recognition process to the image information if the gesture is classified as a long-range gesture.

The invention also provides a computer program product containing instructions for causing a processor to perform a method comprising:
receiving image information from an image sensor, the image information being indicative of a hand gesture;
determining an approximate distance between a user and the image sensor; and
processing the image information in a first manner when the approximate distance is in a first range, and processing the image information in a second manner when the approximate distance is in a second range different from the first range.

At least one of the gesture recognition algorithms may identify a pattern associated with an anatomical structure.

The parameters may be based on predefined ranges for the approximate distance;

Varying the parameters of the gesture recognition algorithm may include recognizing gesture recognition having larger motion vectors at short-range and gesture recognition having smaller motion vectors at long-range.

Discounting motion suspected as a gesture when an expected body part is not part of the image tends to make gesture recognition more robust. For example, t an image containing a hand gesture typically also contains a facial image of a size proportionally related to the size of the hand. Therefore, if the image does not contain an image of a suspected face in proper proportion to the hand, the algorithm discounts the motion as unlikely to be a hand gesture.

Thus, the invention provides a computer program product containing instructions for causing a processor to perform a method comprising:
receiving at least one image from a camera associated with a user-operable device;
detecting in the image, data corresponding to an anatomical structure other than a user's hand;
identifying in the at least one image information corresponding to a suspected hand gesture by a user of the device; and
discounting the information corresponding to the suspected hand gesture if the data corresponding to the anatomical structure other than the user's hand is not identified in the at least one image.

The predefined suspected body part may be a face.

The predefined suspected body part may include a user's eye.

The suspected hand gesture may also be discounted if a proportion of the size of the suspected hand gesture relative to the suspected body part is outside of a predefined range.

The process may further comprise determining locations of at least two body parts of the user within a series of images received from at least one 2-dimensional camera.

The process may further comprise comparing relative size and spatial relationship of the at least two body parts within a series of images.

The process may further comprise adjusting a gesture recognition algorithm based on a comparison of the relative size and spatial relationship of the at least two body parts.

The adjusting may include discounting a potential gesture motion if the parameters resulting from the comparing step do not meet predefined thresholds.

The process may further comprise comparing skin color of the hand with skin color of the suspected body part, and discounting the suspected hand gesture when an insufficient skin color match is determined.

The process may further comprise defining regions of interest within the anatomical structure.

Truncating image processing if an anatomical structure (e.g., a hand) is not detected in an image tends to improve the efficiency of the process and save battery power.

Thus, the invention provides a computer program product containing instructions for causing a processor to perform a method comprising:
attempting to identify in at least one image information corresponding to an anatomical structure;
when the anatomical structure is identified, processing image data from a plurality of images in order to identify a suspected gesture; and
when the anatomical structure is not identified in the at least one image, terminating a gesture recognition algorithm associated with the at least one image.

Attempting to identify may include identifying in the image an area suspected of containing an anatomical structure, segmenting the area into a connected cluster, and comparing the connected cluster with a predefined shape characteristic.

The anatomical structure may be a hand.

The anatomical structure may be a finger.

The suspected image may be within a predefined near range of a camera, and the predefined shape may be a finger.

Using context to trigger a gesturing session tends to increase battery life and enhance a user's experience. When the gesturing session is triggered, the sampling rate of the device increases. By reducing the sampling rate during periods when triggers are not detected, battery life and the efficiency of the device may be increased. For example, the gesture recognition mode of a smart phone device may be activated by the trigger of an incoming phone call, allowing a user to answer the phone with a gesture. Or the gesture recognition mode of a device could be triggered when an alarm clock function is activated and the alarm rings, allowing a user to turn off the alarm with a gesture. Other triggers might include specific hand gestures. In addition, the device may be capable of touch control, and the gesture recognition mode may be triggered by a touch-based trigger.

Thus, the invention provides a computer program product containing instructions for causing a processor to perform a method comprising:

receiving image data from an image sensor associated with a user-operable device;
enabling processing of image data from the image sensor in at least first and second modes, the first mode including processing less image data than in the second mode;
operating the processing in the first mode;
detecting a context-based trigger indicative of an increased likelihood of an expected gesture by a user; and
switching the processing from the first mode to the second mode when the context-based trigger is detected.

The process may further comprise, after switching, returning the processing to the first mode after a predefined time lapse without detection of a suspected gesture.

The image data may include a hand.

The image data may include a finger.

The image data may include a plurality of images of a hand.

The trigger may be a detected touch on a touch screen.

The trigger may be a press of at least one of a physical button and a virtual button.

The trigger may include passing a hand over the camera at close proximity.

The trigger includes a sound received from a microphone connected to the device.

The trigger may include detection of at least one of the user's eyes and face in a pattern indicative of the user looking at the device.

The trigger may cause the camera to increase the frame rate.

The trigger may include a signal from a proximity sensor.

The trigger may include an event occurring in software running on the processor.

The trigger may include motion detected by the camera.

The process may further comprise recognizing a context-based gesture related to the context-based trigger.

The context based trigger may be an alarm, and the context-based gesture may be selected from a group consisting of turning off the alarm, resetting the alarm to ring again after a predefined time has elapsed, modulating a volume of the alarm, entering a mode to allow the user to select music to be played, and changing an alarm tone of the alarm.

The context based trigger may be an incoming phone call, and the context-based gesture may be selected from a group consisting of answering the incoming call, diverting the incoming call to voicemail, and activating a video conference mode of the mobile phone.

A gesture recognition mode may be active for a predefined period of time after the context-based trigger.

The context-based trigger may be the beginning or end of a song and the device may be an audio player.

The context-based trigger may be the beginning or end of a video program and the device is a video player.

After a context-based trigger is detected, the second mode may remain active for a period corresponding to known user behavioral patterns.

An amount of information received in the first mode may be greater than an amount of information received in the second mode.

In the first mode, the sampling rate may be less than 8 frames per second.

In the first mode, the sampling rate may be less than 5 frames per second.

In the first mode, the sampling rate may be two frames per second.

In the first mode, the device may be configured to be controlled in a manner other than through gesture recognition.

In the first mode, the device may be configured to be controlled by detected touch on a touch screen.

A frame sampling rate may be variable and at least one of lighting conditions, current application in usage, and extent of image motion may determine the frame sampling rate.

With touch screen mobile devices that also enable touch-free control, not every control need be touch-free. In such situations, users may benefit from some form of indication that a current level of control may occur in a touch-free manner. Otherwise, users may become frustrated attempting touch-free control when touch-free control is not available.

Thus, the invention provides a computer program product containing instructions for causing a processor to perform a method comprising:

receiving information from a camera associated with a touch screen device, the information reflective of a hand gesture;
displaying on the display information that is activatable via touch;
displaying on the display information that is activatable via camera-detected hand gesture; and
providing at least one of an audible and visual cue to the user that the second information is activatable via non-touch motion.

The information may be a visual indicator on the display indicating to the user that certain gesture commands are currently recognizable by the camera.

The process may further comprise, after a detected gesture, providing feedback information that a gesture was detected.

The process may further comprise alerting a user that information on the display is not activatable via a touch-free gesture when a gesture is detected and when information on the display is not activatable by a touch-free gesture.

The alerting that information on the display is not activatable may include one of a tone and a visual indicator.

Particularly when there is a delay in implementing a command based on a gesture, it is beneficial to provide a user with feedback indicating that the gesture was recognized. Without such feedback, users might repeat gestures unnecessarily and become frustrated, believing that the gesture recognition algorithm is defective.

Thus, the invention provides a computer program product containing instructions for causing a processor to perform a method comprising:

detecting with an image sensor a human gesture indicative of a device command;

implementing the device command on the device; and during a period prior to implementation of the command, providing a feedback to a user that the command was recognized.

The feedback may include a visual indicator on a display of the device.

The visual indicator may include a moving indicator on the display.

The visual indicator on the display may approximate a direction of the gesture.

The feedback may include an audible signal from the device.

The feedback may vary based on a particular use case.

The feedback may include at least one of haptic feedback, directional vibration, air tactile feedback, ultrasonic feedback, and audible feedback.

Typically, a gesture is followed by a return motion, where the hand returns to the location in which it existed prior to the gesture. For example, if a gesture is a hand swipe from right to left, it would not be unusual for the gesture to be followed by a hand movement from left to right. In such an instance, the gesture detection software might be confused into processing the return motion as a gesture in and of itself, thereby undoing the intended first gesture.

Thus, the invention provides a computer program product containing instructions for causing a processor to perform a method comprising:

detecting at least one first set of image data frames containing first hand gesture information;

detecting at least one second set of image data frames containing second hand gesture information corresponding to a reflexive motion following the gesture; and discounting the reflexive motion.

The reflexive motion may be a relaxation movement.

Determining that the second information contains the reflexive motion may include assessing whether the second information occurs within a predefined time frame following the first hand gesture information.

Determining that the second information contains the reflexive motion may include assessing whether a second hand gesture occurs in a direction substantially opposite to the first hand gesture.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 10 shows the image of FIG. 9 after zooming-in;

DESCRIPTION OF EMBODIMENTS

Figure 1:
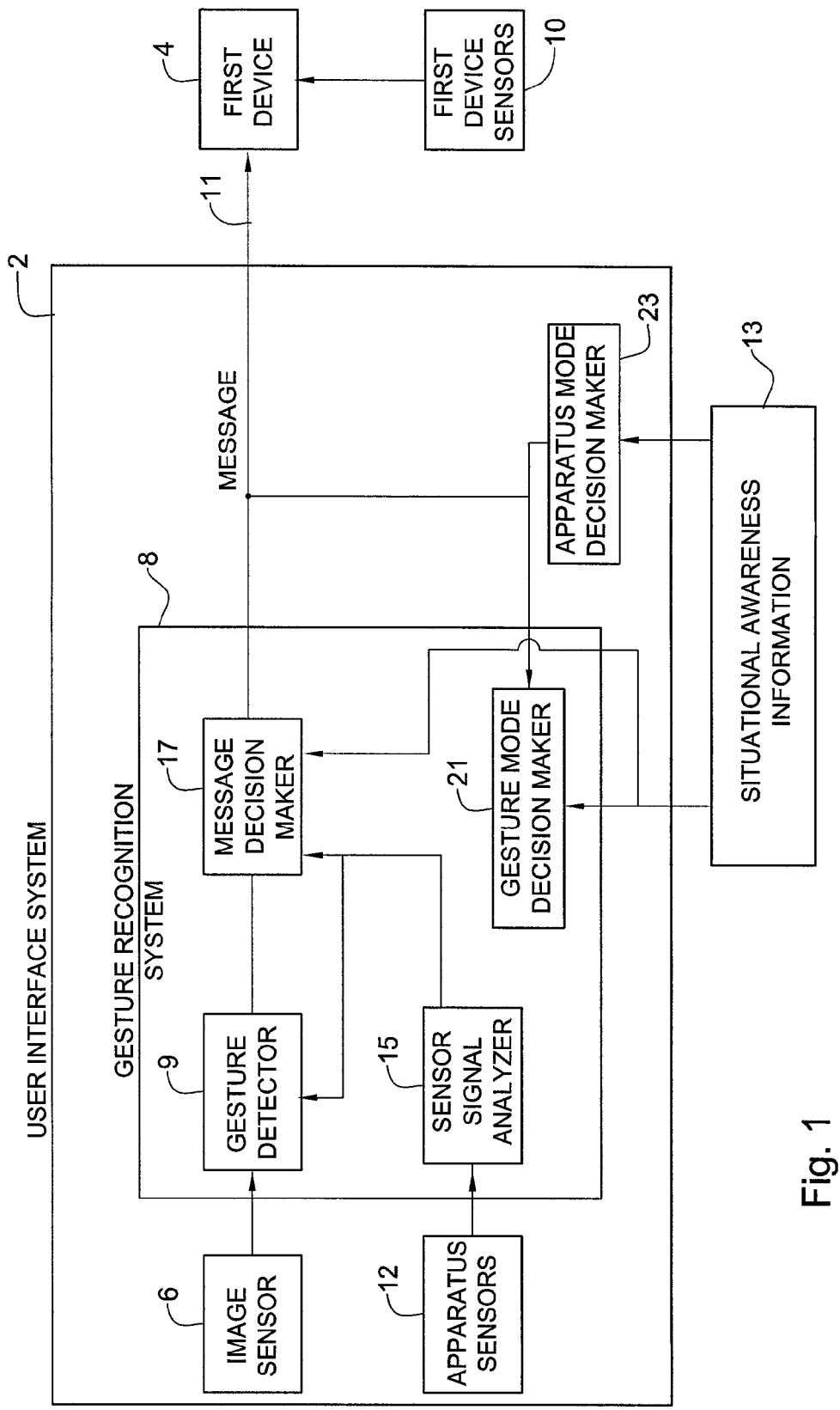
FIG. 1 shows a user interface for controlling a first device in accordance with one exemplary embodiment of the invention.

FIG. 1 shows schematically a user interface apparatus 2 for controlling a first device 4 in accordance with one embodiment of the invention. The first device may be, for example, any user operable device such as a personal computer (PC), a portable computer, a PDA, a laptop, a mobile telephone, a radio, a digital camera, a vehicle, a medical device, a smart home appliance such as a television or home entertainment system, a mobile game machine or a home appliance.

The user interface apparatus 2 comprises an image sensor 6 that may be for example, a camera, a light sensor, an IR sensor, an ultrasonic sensor, a proximity sensor, a CMOS image sensor, a shortwave infrared (SWIR) image sensor, or a reflectivity sensor. Images obtained by the image sensor 6 in a region adjacent to the first device 4 are input to a gesture recognition system 8 which analyzes images obtained by the image sensor to identify one or more gestures from among one or more gestures to be identified when performed by a predefined object in front of the image sensor 6. The predefined object may be, for example, any one or more of a one or more hands, a part of a hand, one or more fingers, one or more parts of a finger, and one or more fingertips.

Examples of the gestures to be identified include a swiping motion, a pinching motion of two fingers, pointing, a left to right gesture, a right to left gesture, an upwards gesture, a downwards gesture, a pushing gesture, opening a clenched fist, opening a clenched fist and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an activatable object, holding an activating object for a predefined amount of time, clicking on an activatable object, double clicking on an activatable object, clicking from the right side on an activatable object, clicking from the left side on an activatable object, clicking from the bottom on an activatable object, clicking from the top on an activatable object, grasping an activatable object the object, gesturing towards an activatable object the object from the right, gesturing towards an activatable object from the left, passing through an activatable object from the left, pushing the object, clapping, waving over an activatable object, performing a blast gesture, performing a tapping gesture, performing a clockwise or counter clockwise gesture over an activatable object, grasping an activatable object with two fingers, performing a click-drag-release motion, and sliding an icon.

The gesture recognition system 8 comprises a gesture detector 9 which tracks the predefined object in sequences of images obtained by the image sensor 6 to detect the occurrence of any one of the gestures to be detected. Detection of a gesture by the gesture detector 9 is input to a message decision maker 17 which generates a first message 11 based upon the identified gesture and the present recognition mode of the gesture recognition system. The first message may further depend on inputs from one or more apparatus sensors 12. Signals from the apparatus sensors 12 are analyzed by a sensor signal analyzer 15. Output from the sensor is signal analyzer 15 may be input to one or both of the gesture detector 9 and the message decision maker 17. The gestures to be identified by the gesture recognition system 8 may depend on the mode of the gesture recognition system and on any analysis of signals from the sensors 12. The first message may be addressed, for example, to the first device, an operating system of the first device, one or more applications running on a processor of the first device, a software program running in the background and one or more services running on the first device or, a process running in the device, on an external network.

Figure 2:
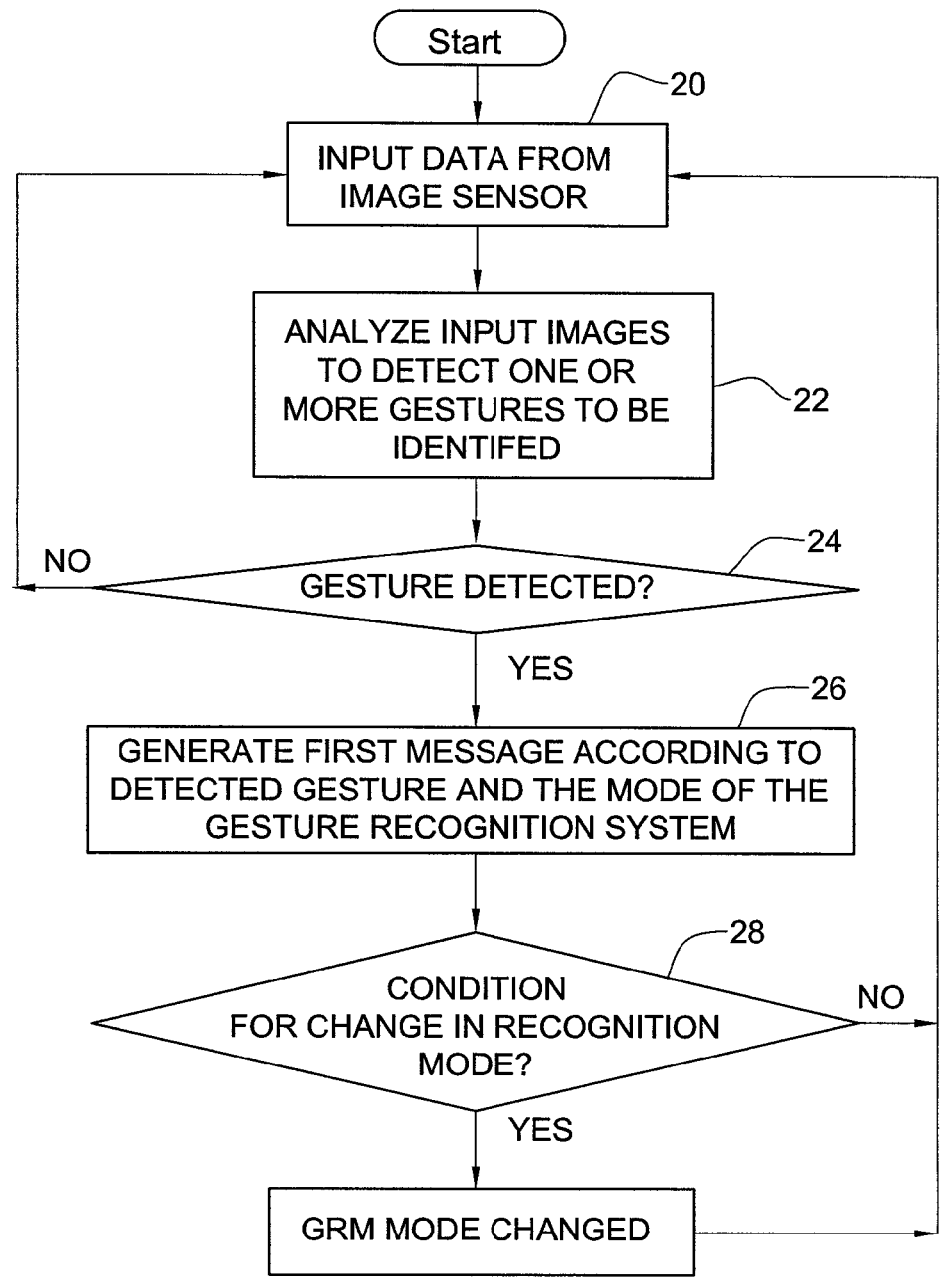
FIG. 2 shows a method for controlling a first device in accordance with one exemplary embodiment of the invention.

The user interface apparatus 2 executes a method shown in the flow chart of FIG. 2. In step 20, data generated by the image sensor 6 from a sequence of images is input to the gesture recognition system 8. The gesture detector 9 then runs a gesture recognition module. In step 22, the gesture recognition module analyzes the image data generated by the image sensor 6 from a sequence of images to detect one or more predefined gestures to be identified. In step 24, it is determined whether one of the gestures to be detected has been detected. If no, the process returns to step 20 with image data generated by the image sensor 6 from a sequence of images being input to the gesture recognition system 8. If yes, then in step 26 a first message is generated according to the detected gesture and the recognition mode of the gesture recognition system 8.

The gesture recognition module operates in each of two or more recognition modes, which is determined by the gesture mode decision maker 21 which is configured to change the recognition mode from an initial recognition mode to a second recognition mode, under one or more various conditions, as explained below. In step 28 it is determined whether a predefined condition exits for changing the mode of the gesture recognition system. If yes, then in step 30, the mode of the gesture recognition system is changed. The process then returns to step 20 with image data generated by the image sensor 6 from a sequence of images being input to the gesture recognition system.

The second recognition mode is determined based upon any one or more of the initial recognition mode of the gesture recognition, a gesture identified by the gesture recognition system 8, and situational awareness information 13. The term "situational awareness information" is used herein to refer to information related to any one or more of a state of the first device, information obtained by one or more system sensors 12 associated with the interface system 2, information obtained by one or more first device sensors 10 associated with the first device, information related to one or more processes running on the device, information related to applications running on the device, information related to a power condition of the device, information related to a notification of the device, information related to movement of the device, information related to a spatial orientation of the device, information relating to an interaction with one or more users information relating to user behavior and information relating to one or more triggers.

The situational awareness information 13 may be information related to a state of the first device and the state of the first device is determined by any one or more of a state of a sensor, an operational state of a software application, a process running in the device, a service running in the device, a software program running in the foreground, one or more software programs running in the background, a network connected state of the device, a power state of the device, a light intensity of the screen of the device.

The situational awareness information 13 is input to the gesture mode decision maker 21 and to the message decision maker 17.

The predefined condition for changing the mode of the gesture recognition system 8 may depend on situational awareness information provided to the gesture recognition system 2. Such situational awareness information may include, for example, a specific application that is running on the first device 4, an application changed to a mode in which no detection of gestures is required, the first device is in low power mode, the first device went into a stand-by mode, a predefined amount of time has elapsed since a gesture was identified or a notification was presented, change in the mode or behavior of an application has occurred, the first device has been moved from one location to another location, the first device been unlocked, the first device has stopped being moved, a virtual or real button was pressed, the first device was placed in a cradle, a notification was received such as a notification received over a network, an online service notification was received, a notification generated by the device or an application or by a service was received, an incoming voice or video call via a cellular network was received, a wireless network, TCPIP, or a wired network, an incoming 3D video call, a text message notification, a notification of a meeting, a community network based communication, a Skype notification, a facebook notification, a twitter notification, an on-line service notification, a missed call notification, an email notification, a voice mail notification, a device notification, a beginning or an end of a song on a player, a beginning or an end of a video, detection of a user looking at the first device, detection of a face in an image obtained by the image sensor, detection of one or more eyes in an image obtained by the image sensor, detection of one or more hands or portions of a hand in an image obtained by the image sensor, detection of a predefined individual looking at the first device, detecting a predefined gesture.

Other examples of a predefined condition for changing the mode of the gesture recognition system 8 include conditions determined from an analysis of signals from the system sensors 12 or the first device sensors 10, a touch on a touch screen, a sound received by a microphone connected to the first device, an analysis of light sensor signals or accelerometer signals to decide whether the first device was removed from a pocket or a bag, the orientation of the first device was changed.

Yet additional examples of predefined conditions for changing the mode of the gesture recognition system 8 include a change between modes of the gesture recognition module changing between mode of analyze low frame rate to high frame rate and or change between analyze low resolution images to mode of analyze high resolution images:

As a specific example, an initial mode of the gesture recognition module may be analysis of video input from the image sensor at a low frame capture rate, and a second mode may be analysis of video input from the image sensor at a high frame capture rate. In this case the precondition for changing the recognition mode from the initial mode to the second mode may be, for example, a touch on a touch screen, a sound received by a microphone connected to the first device, an analysis of light sensor signals or accelerometer signals to decide whether the first device was removed from a pocket or a bag, the orientation of the first device was changed.

The first device sensors 10 may be, for example a camera, a light sensor, an ultrasonic sensor, proximity sensor, pressure sensor, conductivity sensor, motion sensor, temperature sensor, accelerometer, gyroscope, orientation sensor, magnetic sensor, gravity sensor, and a reflectivity sensor a conductivity sensor and capacitance sensor and image sensor. The first device 4 may be integral with interface system apparatus 2 and the first device sensors 10 may be integral with the first device 4.

The gesture mode decision maker 26 may be configured to change the recognition mode from the second mode back to the initial mode after a predefined amount of time has elapsed or after a predefined amount of time has elapsed since a gesture was identified or after a predefined amount of time has elapsed since a notification was presented.

The recognition modes of the gesture recognition, module may be defined or specified by one or more features, such as the gestures to be identified, the first message for each of one or more predefined gestures to be identified, algorithms that are active on the gesture recognition system; and, the second recognition mode for various gestures to be identified, a resolution of images captured by the image sensor, or a capture rate of images captured by the image sensor.

The user interface apparatus 2 may also operate in two or more interface modes where the current interface mode is defined by the recognition mode of the gesture recognition module as well as by one or more signals from one or more of the apparatus sensors 12 to be analyzed by the gesture recognition system 8. The interface mode may depend on one or both of the situational awareness information 13 and the first message.

A change in the interface mode may generate a third message, for example, to the first device 4, to an application running on the first device, to a service running on the first device, a process running on the first device or to an operating system running on the first device.

The first or third message may include a command, to provide an indication of the interface mode, the mode of the gesture recognition system, and the gestures to be identified. The indication may be, for example, a visual indication, an audio indication, a tactile indication, an ultrasonic indication, a haptic indication. A visual indication may be, for example, in a form such as an icon displayed on a display screen, a change in an icon on a display screen, a change in color of an icon on a display screen, an indication light, an indicator moving on a display screen, a directional vibration indication, an air tactile indication. The indication may be provided by an indicator moving on a display screen. The indicator may appear on top of all other images or video appearing on the display screen. The indication may depend on the current situational awareness information.

The situational awareness information may be information related to one or more triggers. A trigger may be, for example, a change in user interface of an application, a change in a visual appearance of an application, a change in mode of an application, a change in state of an application, an event occurring in software running on the first device, a change in behavior of an application, a notification received via a network, an online service notification, a notification generated by the device or an application or by a service from a touch on a touch screen, a pressing of a virtual or real button, a sound received by a microphone connected to the device. Other examples of triggers include a gesture, passing of an object over the first device at a distance less than a predefined distance, detection of a user looking at the first device 4, detection of a face in an image obtained by the image sensor 6, detection of one or more eyes in an image obtained by the image sensor, detection of one or more hands or portions of a hand in an image obtained by the image sensor, and detection of a predefined individual looking at the first device. detection of a user holding the first device, a signal from a proximity sensor, an alarm sounding on an alarm clock, an incoming voice or video call via a cellular network, a wireless network, TCPIP, or a wired network, an incoming 3D call, a text message notification, a notification of a meeting, a community network based communication, a Skype notification, a facebook notification, a twitter notification, an on-line service notification, a missed call notification, an email notification, a voice mail notification, a device notification, a beginning or an end of a song on a player, a beginning or an end of a video.

The situational awareness information may be related to a state of the first device 4, in which case, the first message may be addressed to the first device and receipt of the first message at the first device may result in a change in state of the first device. A change of state of the first device may include an increase or decrease in the light intensity of a display on the first device, a change in the first device state from a locked mode to an unlocked mode or vice versa, turning on or off one or more sensors, a change in the configuration and/or parameters of one or more sensors, enabling/disabling a zooming mode, a change into a silent mode, enabling/disabling presentation of notifications, a change in the device to a mute mode, or turning on or off a speaker mode.

The first message may provide any one or more of the indications that a gesture was recognized, which specific gesture was recognized, features of the gestures that was recognized, such as motion vector, speed, location where the gesture was recognized, the reliability of the recognition.

The first message may include a command, for example, a command to the first device 4, to an application running on the first device 4, to a service running on the first device 4, and an operating system running on the first device 4 to a process running on the first device. The command may be, for example, a command to run an application on the first device 4, a command to stop an application running on the first device 4, a command to activate a service running on the first device 4, a command to stop a service running on the first device 4.

The command may be a command to the first device such as depressing a virtual key displayed on a display screen of the first device; rotating a selection carousel; switching between desktops, running on the first device a predefined software application; turning off an application on the first device; turning speakers on or off; turning volume up or down; locking the first device, unlocking the first device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, controlling interactive video or animated content, editing video or images, pointing at a map, zooming-in or out on a map or images, painting on an image, pushing an icon towards a display on the first device, grasping an icon and pulling the icon out form the display device, rotating an icon, emulating touch commands on the first device, performing one or more multi-touch commands, a touch gesture command, typing, clicking on a displayed video to pause or play, editing video or music commands, tagging a frame or capturing a frame from the video, cutting a subset of a video from a video, presenting an incoming message; answering an incoming call, silencing or rejecting an incoming call, opening an incoming reminder; presenting a notification received from a network community service; presenting a notification generated by the first device, opening a predefined application, changing the first device from a locked mode and opening a recent call application, changing the first device from a locked mode and opening an online service application or browser, changing the first device from a locked mode and opening an email application, changing the first device from locked mode and opening an online service application or browser, changing the device from a locked mode and opening a calendar application, changing the device from a locked mode and opening a reminder application, changing the device from a locked mode and opening a predefined application set by a user, set by a manufacturer of the first device, or set by a service operator, activating an icon, selecting a menu item, moving a pointer on a display, manipulating a touch free mouse, an icon on a display, and altering information on a display.

When the first message is addressed to the first device 4, the first device 4 may generate, in response to the first message, a second message, for example, to a remote device 16, an operating system running on a remote device, one or more remote applications, or one or more remote services. The second message may be a command.

The first message generated by the gesture interface system 8 may be addressed to an application running on the first device 4 or to a remote application, in which case, the first message may be interpreted by a first running application on the first device 4 in a first manner and the same message may be interpreted by a second running application on the first device 4 in a second manner.

The gesture recognition system 8 may be configured to generate a fourth message when the mode of the gesture recognition system is changed from the initial mode to the second mode. The fourth message may include a command, for example, a command to the first device 4, an application running on the first device 4, a service running on the first device 4, and an operating system running on the first device 4. The command may be a command, to provide an indication, for example, that the gesture recognition system 2 is ready to recognize gestures, the gesture recognition system 2 is ready to recognize one or more predefined gestures, the gesture recognition system 2 is not ready to recognize gestures, ambient light conditions do not permit gesture recognition, or the gesture recognition system 2 is not ready to recognize gestures. The indication may be, for example, a visual indication, an audio indication, a tactile indication, a haptic indication. A visual indication may be, for example, an icon displayed on a display screen, a change in an icon on a display screen, a change in color of an icon on a display screen, an indication light.

The initial mode and the second interface modes may be defined by a capture rate of images captured by the image sensor 6. The capture rate in the second mode may be less than or greater than the capture rate of the initial mode. The initial mode and the second mode may be defined by a resolution of images captured by the image sensor, and the resolution of images of the second mode may be greater than or less than the resolution of images of the initial mode.

The first device 10 may comprise a processor such as a dedicated processor, a general purpose processor, a DSP (digital signaling processor) processor, a GPU (graphical processing unit) processor, dedicated hardware, or a processor that can run on an external device. The first device 4 may run the interface apparatus 2 as a program on one or more processors of the first device 4.

In one embodiment of the invention, detection of a first object in an image obtained by the image sensor 6 is used as a trigger and in the second recognition mode the gesture recognition module identifies a second object in an image obtained by the image sensor and including the first object, where the second object has a predefined spatial relationship to the first object. In this case, the gesture recognition system may be configured to detect a gesture performed by the second object. The first and second objects may be, for example, a first and second body part, respectively. For example, the first body part may be a face, one or two eyes, a first hand or a portion of a first hand, or a first hand in a first pose. The second body part may then be a second hand or a portion of a second hand, or a second hand in a second pose. The predefined spatial arrangement between the first and second objects may be specified by a vector from a center of gravity of the first object to a center of gravity of the second object. The vector may have one or both of a magnitude in a predefined range and a direction in a predefined range.

Figure 3:
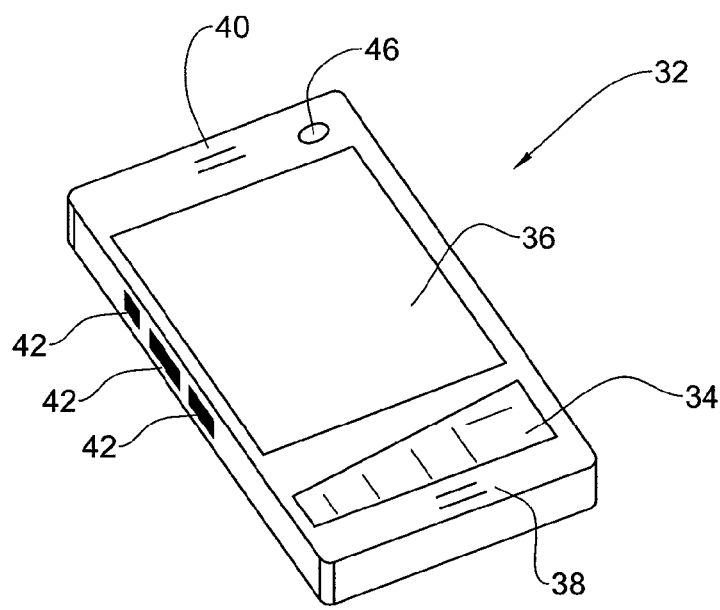
FIG. 3 shows a device comprising the user interface system in accordance with one embodiment of the invention.

FIG. 3 shows a first device 32 that could be the first device 4 shown in FIG. 1. The first device 32 comprises the user interface system 2 in accordance with one embodiment of the invention. The first device 32 is a hand-held device, and may be, for example, a mobile phone, tablet or a portable media/music player, and includes a display screen 36 that can be a touch screen, and/or a keypad 34. The first device 32 includes an image sensor 46 and may also include a microphone 38 and a speaker 40.

Figure 4:
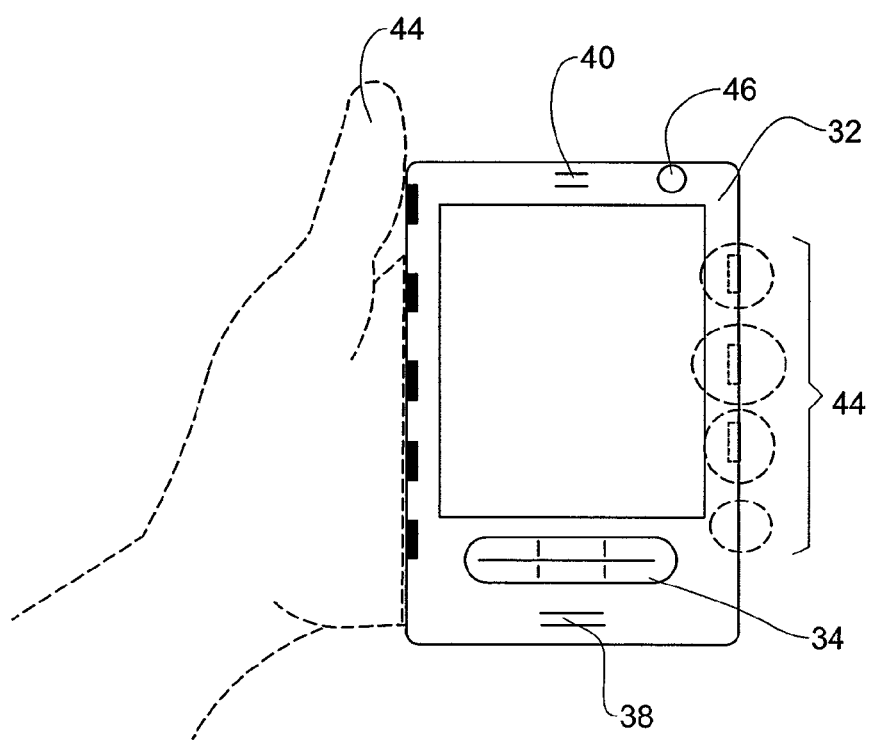
FIG. 4 shows the device of FIG. 3 being held by a hand.

The first device 32 includes one or more first device sensors 42 located on the surface of the first device 32 that monitor the value of one or more parameters in the environment of the device. In this example, the first device sensors 32 are positioned at locations on the surface of the device 32 so that when the device 32 is being held in a hand, the hand is in contact with one or more of the sensors, as shown in FIG. 4. When the hand 34, shown in phantom lines in FIG. 4, contacts one or more of the sensors 42, the value of the monitored parameter changes. One or more of the sensors may detect, for example, the ambient temperature, in which case a rise in temperature detected by the sensors 42 is indicative of contact between the hand and the sensors. Alternatively or additionally, the one or more of the sensors may detect a change in ambient conductivity or capacitance, either one of which is indicative of contact between the user's hand 44 and the first device sensors 42 are input to the decision maker x, as situational awareness information, as explained above.

Figure 5:
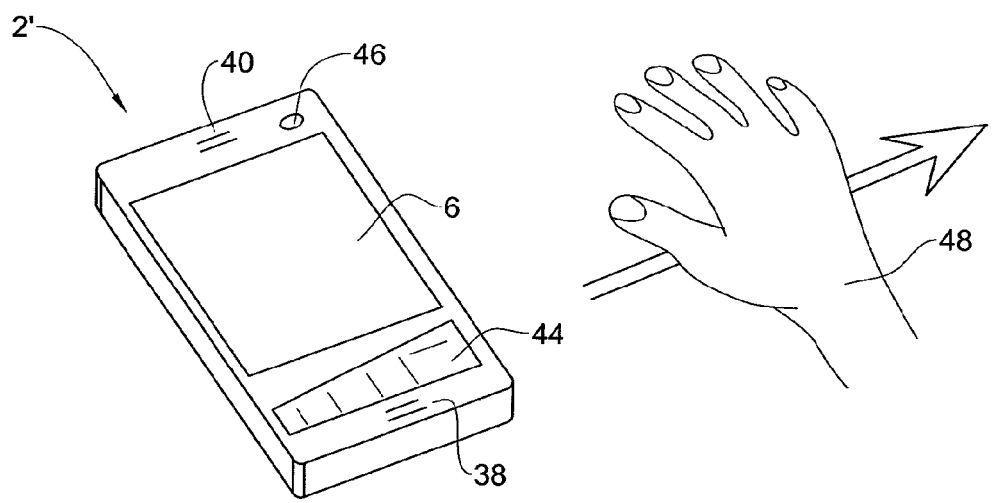
FIG. 5 shows performing a gesture in front of the device of FIG. 3.
Figure 6:
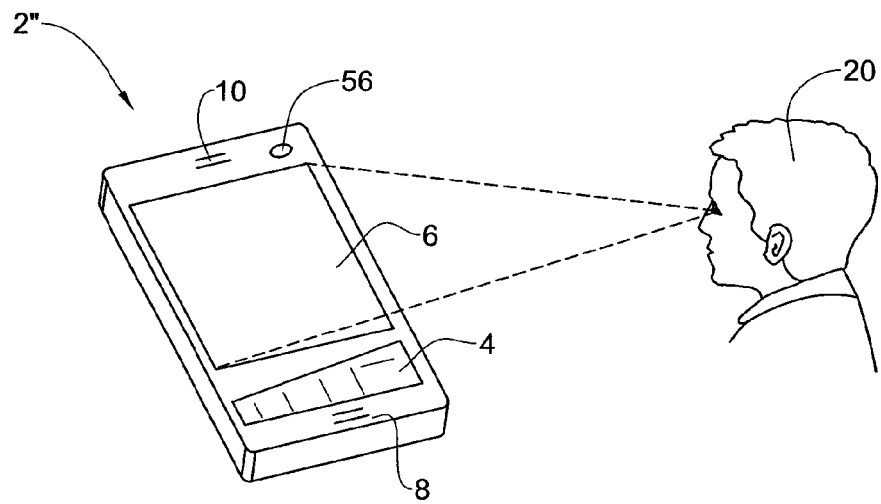
FIG. 6 shows the device of FIG. 3 being looked at by a user.

The image sensor 46 is positioned on the surface of the first device 42 to obtain video images of a portion of three dimensional space in front of the first device 42 that are input to the gesture recognition system, so that when a performs a hand gesture with the user's hand 48 (FIG. 5) over the device 42, the gesture is recorded by the image sensor and detected by the gesture recognition system. Signals from the sensors 42 are input to the sensor signal analyzer 15 (FIG. 1) and the output from the sensor signal analyzer is output to the gesture detection decision maker 17, as explained above.

Figure 7:
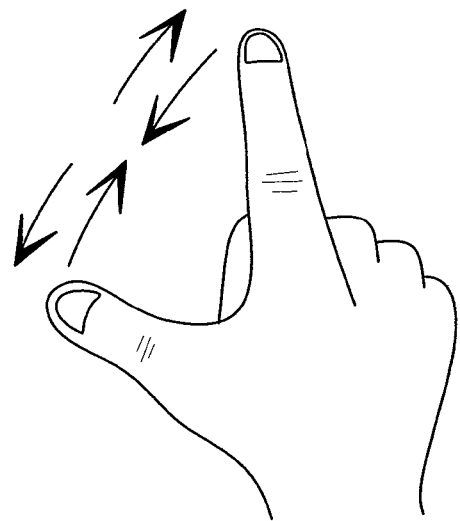
FIG. 7 shows a tapping gesture.
Figure 8:
FIG. 8 shows a clicking gesture.
Figure 9:
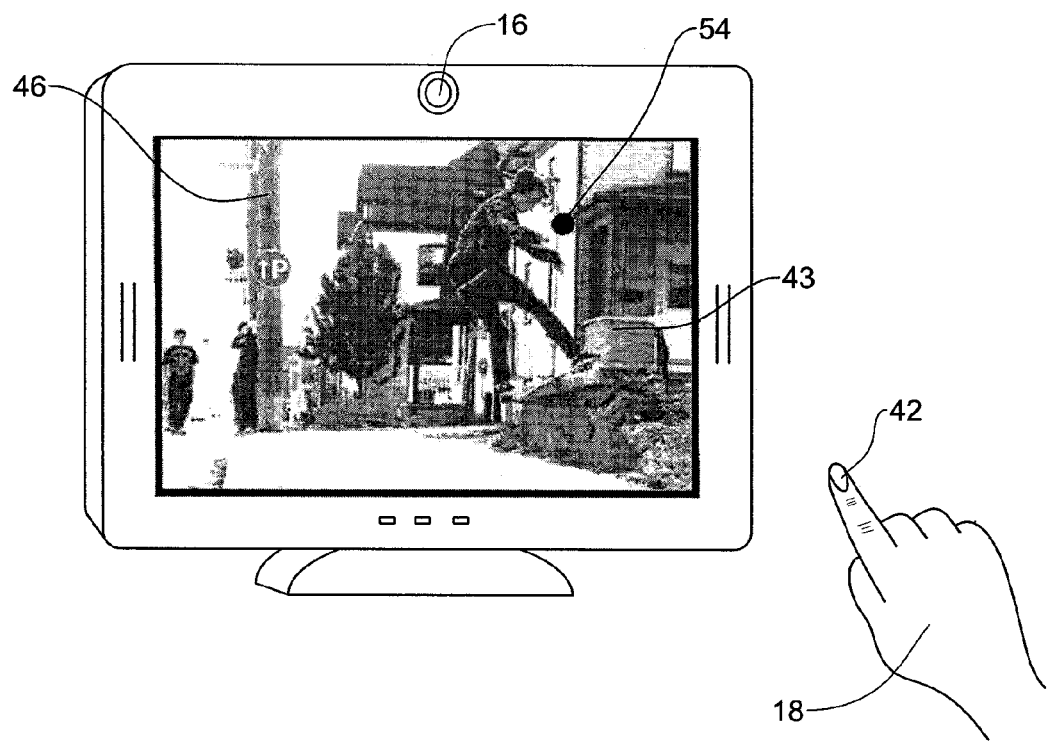
FIG. 9 shows an image displayed on a display device.

An embodiment of the invention is configured to perform zoom-in or zooming-out of an image displayed on a display of the first device 4. A user may first perform a predefined gesture to enter a zoom mode. For example, as shown in FIG. 7, the predefined gesture to enter a zooming mode may be, "tapping" motion which consists of a change in separation of a forefinger of a hand from the thumb of the hand. As another example, shown in FIG. 8, the predefined gesture indicative of a command to enter the zoom mode consists of a "clicking" motion. A clicking motion consists of moving the tip of a finger 40 towards the image sensor 6 and then moving the finger tip away from the image sensor 6. When the processor detects that the user's hand has performed the predefined gesture indicative of a command to enter the zoom mode, the user interface 2 brings the first device 4 into the zoom mode.

Once the first device 4 has been brought into the zoom mode, the user may point at a point in an image 43 on the display, without touching the display. The user interface 2 may then determine from the appearance of the user's finger 42 in images obtained by the image sensor 6 the point on the display screen 46 at which the user is pointing. The processor may indicate to the user where the processor has determined that the user is pointing by introducing into the image 43 a dot 54 or any type of feedback at that location.

Once the device 4 has been brought into a zooming mode, the processor analyzes video streams obtained by the image sensor 6 to determine whether the user's finger or fingers have performed a gesture indicative of a command for zooming in or a command for zooming out from an image being displayed on the display screen 46.

For example, in one embodiment, a forefinger of a hand separated from a thumb of the hand by a first distance is identified. A change in the separation of the forefinger and thumb to a second distance is then identified, where the second distance is less than the first distance being indicative of a command to enter a first zooming mode and to perform zooming in accordance with the first zooming mode. The first zooming mode is either a zoom-in mode or a zoom-out mode. When the second distance is greater than the first distance this is indicative of a command to enter a second zooming mode and to perform zooming in accordance with the second zooming mode. The second zooming mode is also either a zoom-in mode or a zoom-out mode but the second zooming mode is different from the first zooming mode. One or more instances of a change in the separation of the forefinger and thumb are identified and zooming is performed according to the zooming mode during each instance of the change in the separation of the forefinger and thumb. Another example, instances of a change may be defined as one instance as long as the forefinger and the thumb continue to separate one from the other until they reach a maximum distance, and then approach each other until they reach a minimal distance.

In another embodiment, an extended finger is identified in an initial orientation, and then of the finger in a first direction or a second direction is identified. A change in the orientation from the initial orientation to a second orientation in the first direction is indicative of a command to enter a first zooming mode and to perform zooming in accordance with the first zooming mode, where the first zooming mode is either a zoom-in mode or a zoom-out mode. A change in the orientation from the initial orientation to a second orientation in the second direction is indicative of a command to enter a second zooming mode and to perform zooming in accordance with the second zooming mode, where the second mode is also either a zoom-in mode or a zoom-out mode where the second zooming mode is different from the first zooming mode. One or more instances of a change in the extended forefinger from the first orientation to the second orientation are then identified. Zooming according to the zooming mode may then be performed during each instance of the change in the orientation of the extended finger from the initial orientation to the second orientation. Alternatively, zooming according to the zooming mode may be performed as long as the extended forefinger remains in the second orientation. The zooming may have a zooming rate that increases with increasing distance between a tip of the finger in the initial orientation and the tip of the finger in the second orientation.

As yet another embodiment, a first gesture or a second gesture is identified, where the first gesture comprises moving a hand with splayed apart fingers towards the imaging device while closing the fingers and then moving the hand away from the imaging device and the second gesture comprises moving a hand with closed fingers towards the imaging device while splaying the fingers apart and then moving the hand away from the imaging device. A first zooming mode is entered when the first gesture is identified and a second zooming mode is entered when the second gesture is identified. Zooming is performed according to the zooming mode. The first zooming mode is either a zoom-in mode or a zoom-out mode, and the second zooming mode is also either a zoom-in mode or a zoom-out mode but the second zooming mode being different from the first zooming mode. Zooming is performed according to the zooming mode as long as the first or second gesture continues to be identified.

As still another embodiment, a first gesture or a second gesture is identified, where the first gesture comprises moving a hand with splayed apart fingers towards the imaging device while closing the fingers and then moving the hand away from the imaging device and the second gesture comprises moving a hand with closed fingers towards the imaging device while splaying the fingers apart and then moving the hand away from the imaging device. A first zooming mode is entered when the first gesture is identified and a second zooming mode is entered when the second gesture is identified. Zooming is performed according to the zooming mode. The first zooming mode is either a zoom-in mode or a zoom-out mode, and the second zooming mode is also either a zoom-in mode or a zoom-out mode but the second zooming mode being different from the first zooming mode. Zooming is performed according to the zooming mode as long as the first or second gesture continues to be identified.

Figure 10:
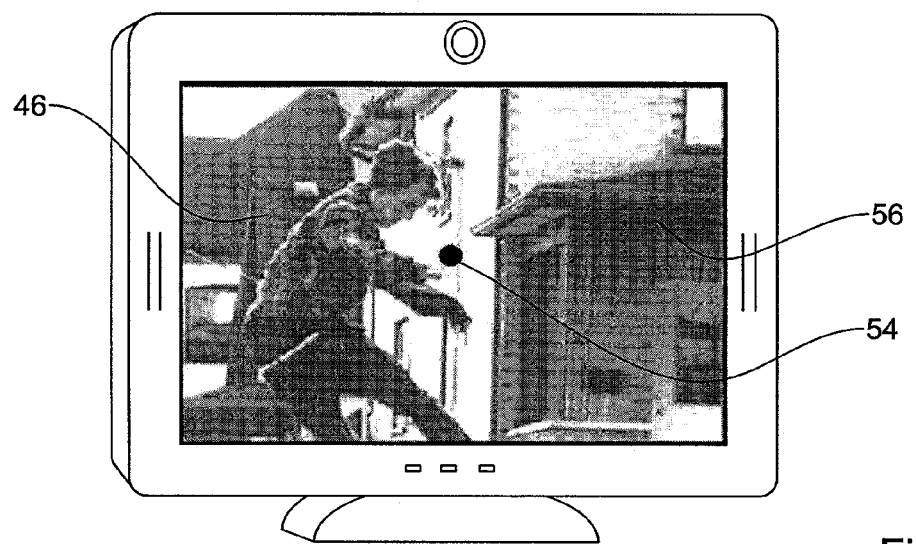

When the interface system 2 has determined that the user has performed the predefined gesture for zooming in or out, the processor will zoom in or out of the image 43 while centering the zooming in on the point previously indicated by the user and indicated by the dot 54. FIG. 10 shows the display screen 46 after the processor has performed zooming in on the image 43, to display the image 56. As long as the interface system 2 is in the zooming mode, the user may perform a sequence of zooming in and zooming out gestures.

The gesture detector may use any method for detecting the predefined objects in images obtained by the image sensor 6. For example, the gesture detector may detect the predefined object as disclosed in WO2005/091125 or in WO 2010/086866.

Figure 11:
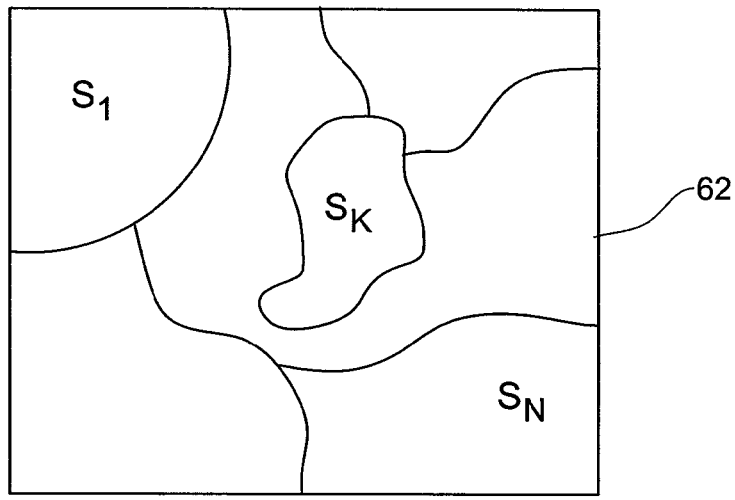
FIG. 11 shows a segmented image.

Alternatively, the gesture detector may detect the predefined object as follows. FIG. 11 shows schematically a segmented image 62. The segmented image 62 is segmented into segments $S_1, \ldots, S_k, \ldots, S_N$, where each segment is a contiguous set of pixels, and each pixel in the image belongs to exactly one of the segments.

Each segment $S_k$ has an associated feature vector $V_k=(v_{k1}, v_{k2}, v_{k3}, \ldots v_{kn})$, for each k from 1 to N. $V_{kj}$ is the numerical value of a jth feature in the segment $S_k$, for each of n features. Examples of such features include an average color intensity of the segment, an average gray level of the segment, size, shape, or a coordinate of the center of mass of the segment $S_k$.

Figure 12:
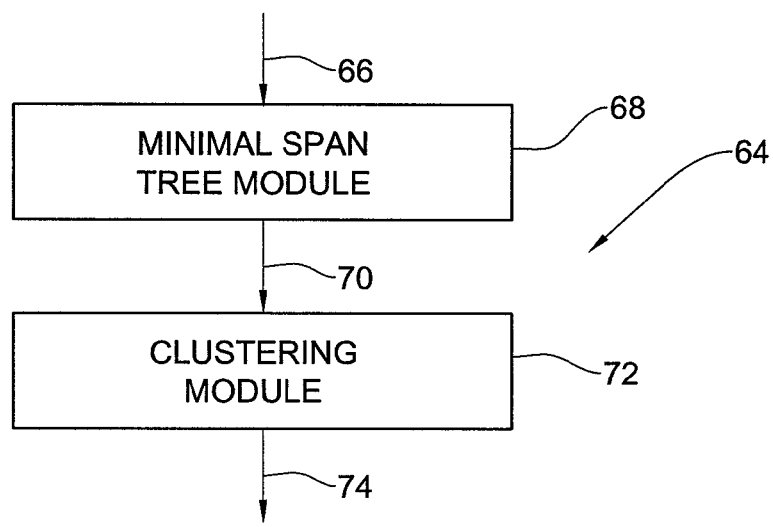
FIG. 12 shows an overview of a method comprising a minimal span tree module and a clustering module for object detection in a segmented image.

FIG. 12 shows a system 64 for detecting m predefined objects in the image 2 in accordance with one embodiment of the invention. The system 64 comprises a Minimal Span Tree Module 68 and a Cluster Module 72. The Minimal Span Tree Module 68 receives as its input 66 an initial list of the segments $S_1, \ldots, S_k, \ldots, S_N$, of the image 62 and the corresponding feature vectors $V_1, \ldots, V_k, \ldots, V_N$. The output 70 of the Minimal Span Tree Module 68 is a final list of segments and the feature vector of each segment in the final list of segments. As explained below, the final list of segments comprises the segments present in the initial list of segments together with additional segments formed by combining one or more neighboring segments into a common segment.

The output 70 of the Minimal Span Tree Module 68 is input to a Cluster Module 72. The output 74 of the Cluster Module is clustering of the segments in the final segment list into a predefined number m of clusters of segments. The Cluster Module may use, for example, a K-Means method.

Figure 13:
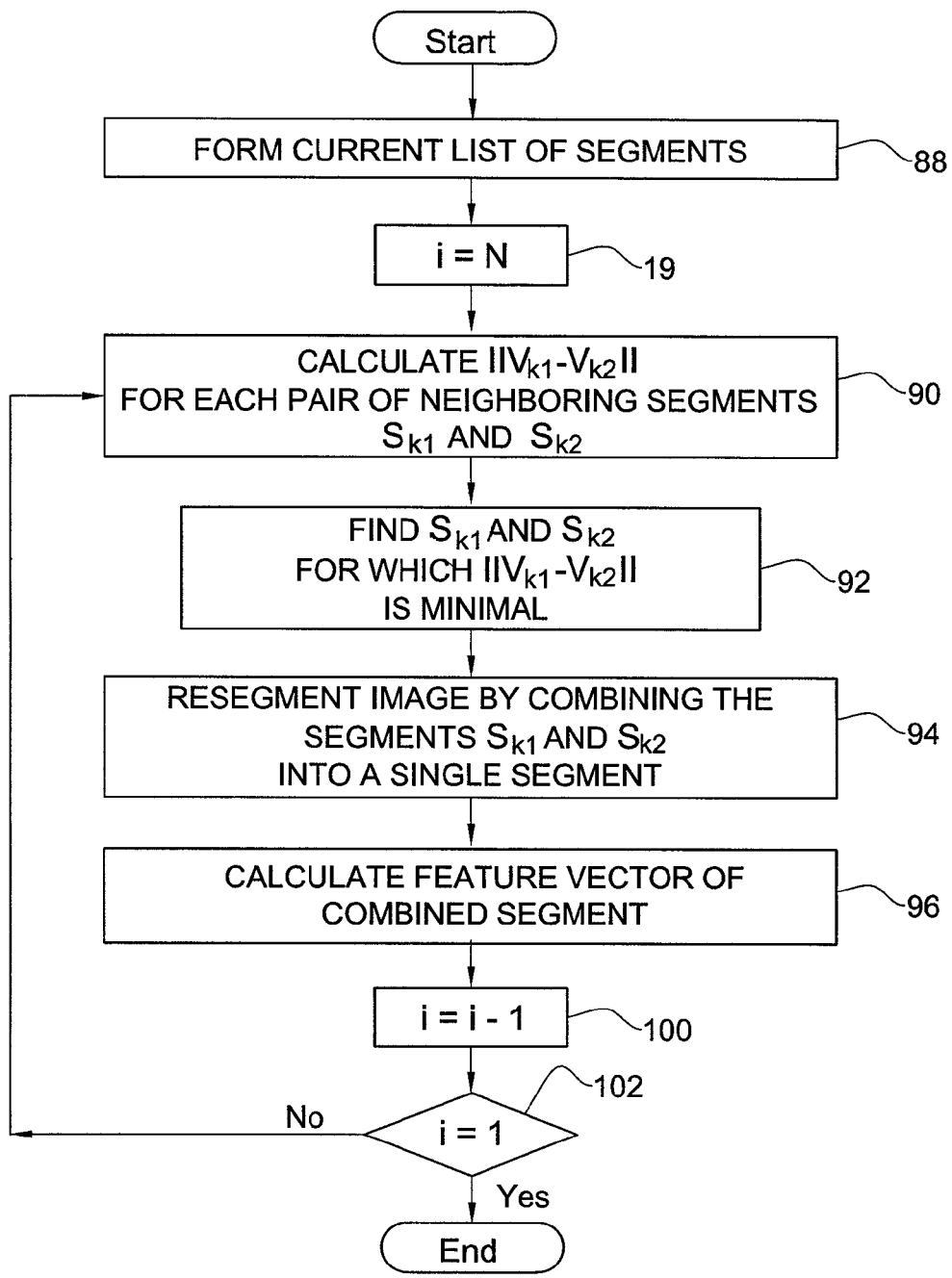
FIG. 13 shows the minimal span tree module of FIG. 12 in greater detail.

FIG. 13 shows a flow chart for a process carried out by the Minimal Span tree Module 8, in accordance with one embodiment of the invention. In step 88, a current list of segments is formed comprising the initial segments $S_1, \ldots, S_k, \ldots, S_N$ in the image 2. In step 89, an index i is set to N, the number of segments in the image 62. Then, in step 90, for each pair of neighboring segments $S_{k1}$ and $S_{k2}$ in the image 62, the distance between the feature vectors of the two segments, $V_{k1}$ and $V_{k2}$ is calculated using a predefined metric. The metric may be, for example, the n dimensional Euclidean metric. In step 92, a pair of neighboring segments $S_{k1}$ and $S_{k2}$ is sought for which the distance $\|V_{k1}-V_{k2}\|$ is minimal among the pairs of neighboring segments. The image 62 is then resegmented by combining the two segments $S_{k1}$ and $S_{k2}$ into a single segment (step 94), thereby reducing the number of segments by 1, so that the current number of segments is i−1. The combined segment $S_{k1}$ and $S_{k2}$ is added to the list of segments, so as to update the list of segments. In step 96, the feature vector of the combines segment is calculated. In step 100, the index i is decreased by 1, and in step 102 it is determined whether i=1. If i is greater than 1, then the process returns to step 90, where the distances are calculated for the current segmentation of the image. If i=1, the process terminates.

Figure 14:
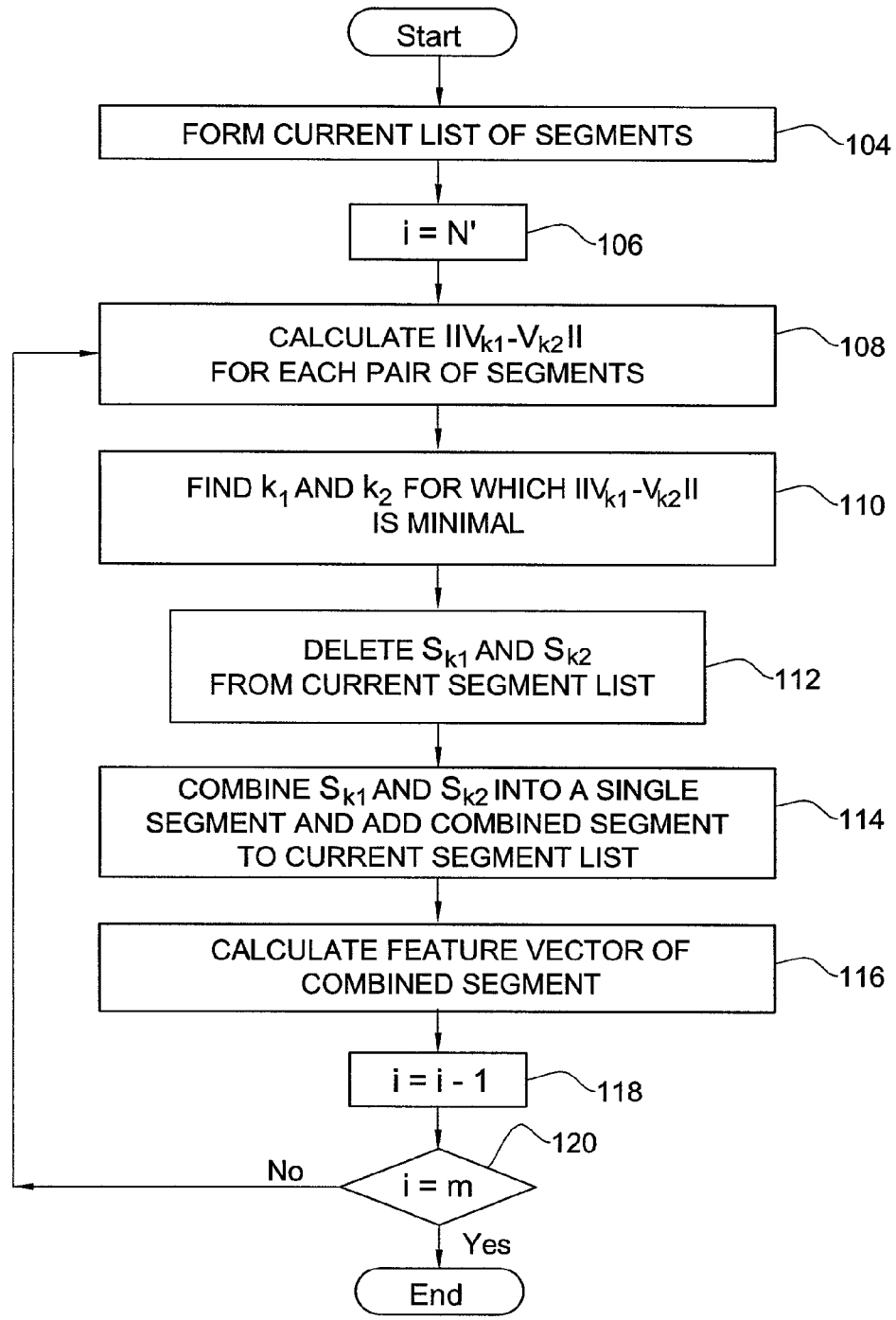
FIG. 14 shows the clustering module of FIG. 12 in greater detail.

FIG. 14 shows a flow chart for a process carried out by the Cluster Module 72, in accordance with one embodiment of the invention. In step 10, a current list of segments is formed comprising the final list of segments $S'_1, \ldots, S'_k, \ldots, S'_{N'}$ output by the minimal span tree module 68. In step 106, an index i is set to N', the number of segments in current list of segments. Then, in step 108, for each pair of segments $S_{k1}$ and $S_{k2}$ on the current list of segments, the distance between the feature vectors of the two segments, $V_{k1}$ and $V_{k2}$ is calculated using a predefined metric. The metric may be, for example, the n dimensional Euclidean metric. In step 110, a pair of segments $S_{k1}$ and $S_{k2}$ on the current list of segments is sought for which the distance $\|V_{k1}-V_{k2}\|$ is minimal among the pairs of segments on the current list. In step 112 the segments $S_{k1}$ and $S_{k2}$ are deleted from the list of segments, and in step 114, the combined segment $S_{k1}$ and $S_{k2}$ is added to the list of segments, so as to update the list of segments. In step 42, the feature vector of the combined segment is calculated. In step 44, the index i is decreased by 1, and in step 46 it is determined whether i=m, the predefined number of objects to be detected in the image. If i is greater than m, then the process returns to step 38, where the distances are calculated for the current segmentation of the image. If i=m, the process terminates. The output 14 of the Cluster Module is thus a segmentation of the image 2 into the predefined number m of segments.

Figure 15:
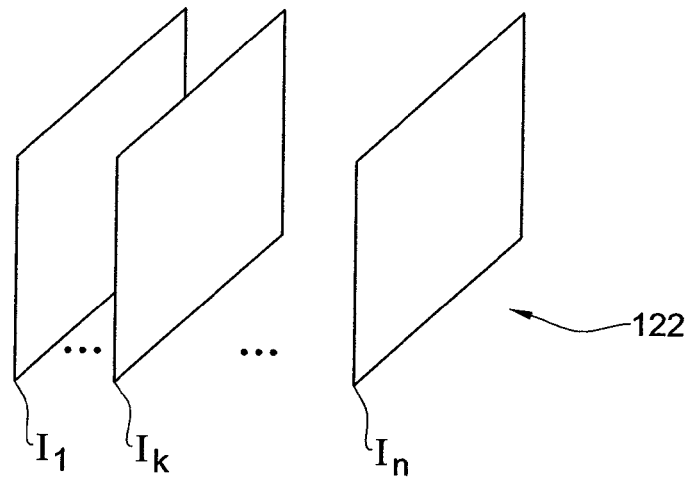
FIG. 15 shows a sequence of images.
Figure 16:
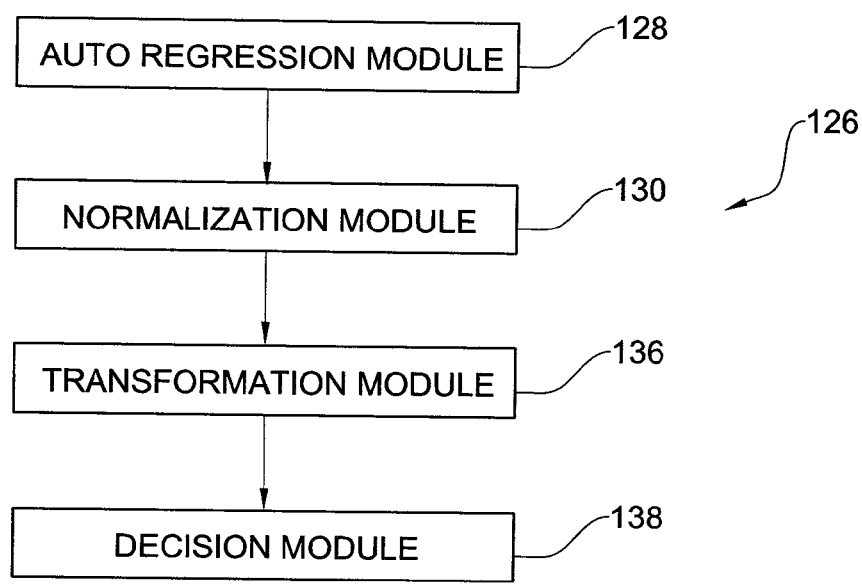
FIG. 16 shows a method for object detection in a sequence of images.
Figure 17:
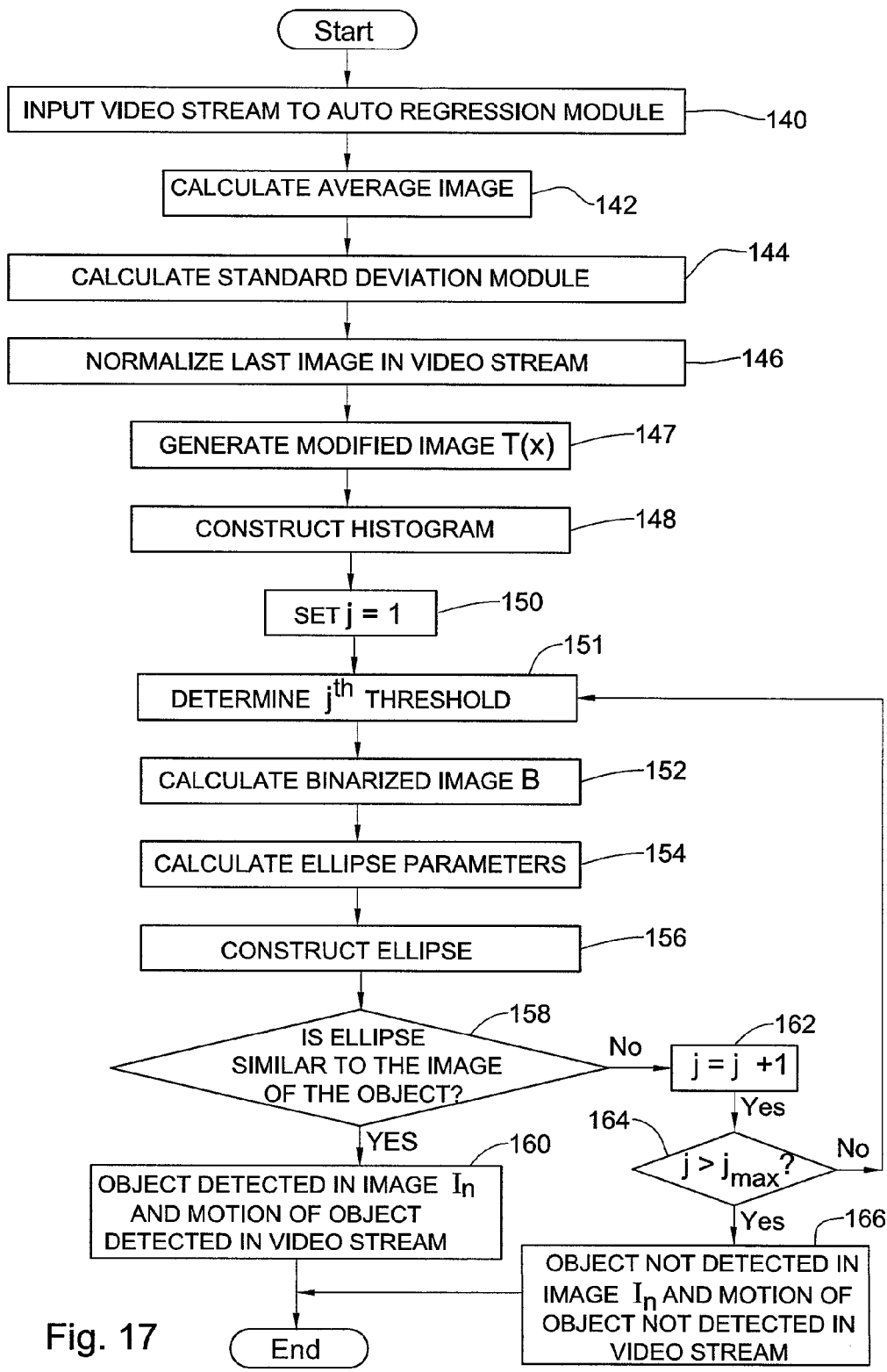
FIG. 17 shows the method for object detection of FIG. 16 in greater detail.

FIGS. 15 to 17 show an alternative method for object detection, in accordance with another embodiment of the invention. FIG. 15 shows schematically a video stream 122. The video steam 122 comprises a sequence of images $I_1, \ldots, I_k, \ldots I_n$. FIG. 16 shows a system 126 for detecting motion of a predefined object in the video stream 122 in accordance with one embodiment. The system 126 comprises an Autoregression Module 128 that receives as an input a video stream of images such as the video stream 122. The output of the Autoregression Module 128 is input to a Normalization Module 130. The output from the Normalization Module 130 is input to a Transformation Module 131. The output from the Transformation Module is input to a Global Threshold Module 132, whose output is then input to a Decision Module 16 where it is determined whether or not motion of the predefined object has been detected in the input video stream.

FIG. 17 shows a method for detection of motion of a predefined object in a video stream, in accordance with an embodiment. In step 140, the video stream 122 is input to the Autoregression Module 128. In step 142, the Autoregression Module 128 calculates an average image A of the input video stream, and in step 144 a standard deviation image STD of the video stream is calculated. The images A and STD can be calculated, for example, using an autoregression algorithm. The average image A and the standard deviation image STD are then input to the Normalization Module 130 together with the most recent image of the input video stream, $I_n$. The Normalization Module 130 in step 146 calculates a normalized image $I_n'$ of the last image $I_n$ in the video stream using the algebraic expression $I(x)_n' = (I(x)_n - A(x))/STD(x)$, for each pixel x in the image.

The original image $I(x)_n$ and the normalized image $I(x)_n'$ are input to the Transformation Module 136 that, in step 147, generates from $I(x)_n$ and $I(x)_n'$ a modified image $T(x)$ that is then input to the Global Threshold Module 130.

The Global Threshold Module 130 generates a histogram from the image $T(x)$ in an iterative process to determine whether or not motion of the predefined object is detected in the video stream. In step 150, the value of an index j is set to 1, and in step 151, a jth threshold value is determined. Then, in step 152, the Globule Threshold Module calculates a binarized image B from the modified image $T(x)$, where pixels of the image $T(x)$ having a value above the jth threshold value are assigned the value 1 in the binarized image B, and pixels of the image $T(x)$ having a value below the threshold are assigned the value 0 in the binarized image B. The global Threshold Module 12 now calculates one or more ellipse parameters based on of the binarized image B (step 154), and then constructs an ellipse having the values of the calculated ellipse parameters (step 156). For example, the Global Threshold Module 136 may calculate the two eigenvalues of the binarized image B and the construct an ellipse having first and second semi-axis lengths equal to the first and second eigenvalues, respectively.

The constructed ellipse is now input to Decision Module 136. The Decision Module 136 compares the constructed ellipse with an image of the object being tracked, and in step 158 determines whether the constructed ellipse is similar to the image of the object. If yes, then in step 160 it is determined that the object has been detected in the image I(x)n and that motion of the object in the video stream has been detected. The process then terminates.

If in step 158 it is determined that the constructed ellipse is not similar in shape to the shape of the object, then in step 162 the value of the index j is increased by 1, and then in step 164 it is determined whether j exceeds a maximum value $j_{max}$. If j exceeds $j_{max}$, then in step 166 it is concluded that the object has not been detected in the image In and motion of the object has not been detected in the video stream.

If in step 166 it is determined that j does not exceed $j_{max}$, then the process returns to step 151 where the jth threshold value is determined. The threshold values are selected so that as the index j increases, the value of the threshold decreases.

The transformed image T(x) can be calculated from I(x)n and I(x)n', for example, using the following process.

In one embodiment, T(x)=I(x)n'.

In another embodiment, an image Ic(x) is first constructed, where Ic is calculated as follows: A weighted histogram of the image I(x)n is constructed, where each pixel x in the image I(x)n is assigned a weight equal to I(x)n'. Ic(x) is then constructed by replacing the value of each pixel in the image I(x)n with the probability of the value of the pixel from the weighted histogram. T(x) is then a function of Ic(x) I(x)n', for example, the sum or product of Ic(x) and I(x)n'.

In another embodiment, an image Isp(x) is calculated, where the value of each pixel in Isp(x) is the probability that motion occurred at the pixel x. In this embodiment, T(x) is a function of any two or more of Ic(x), Isp(x) and I(x)n'. For example, T(x) could be the product of Ic(x), Isp(x) and I(x)n'.

Figure 18:
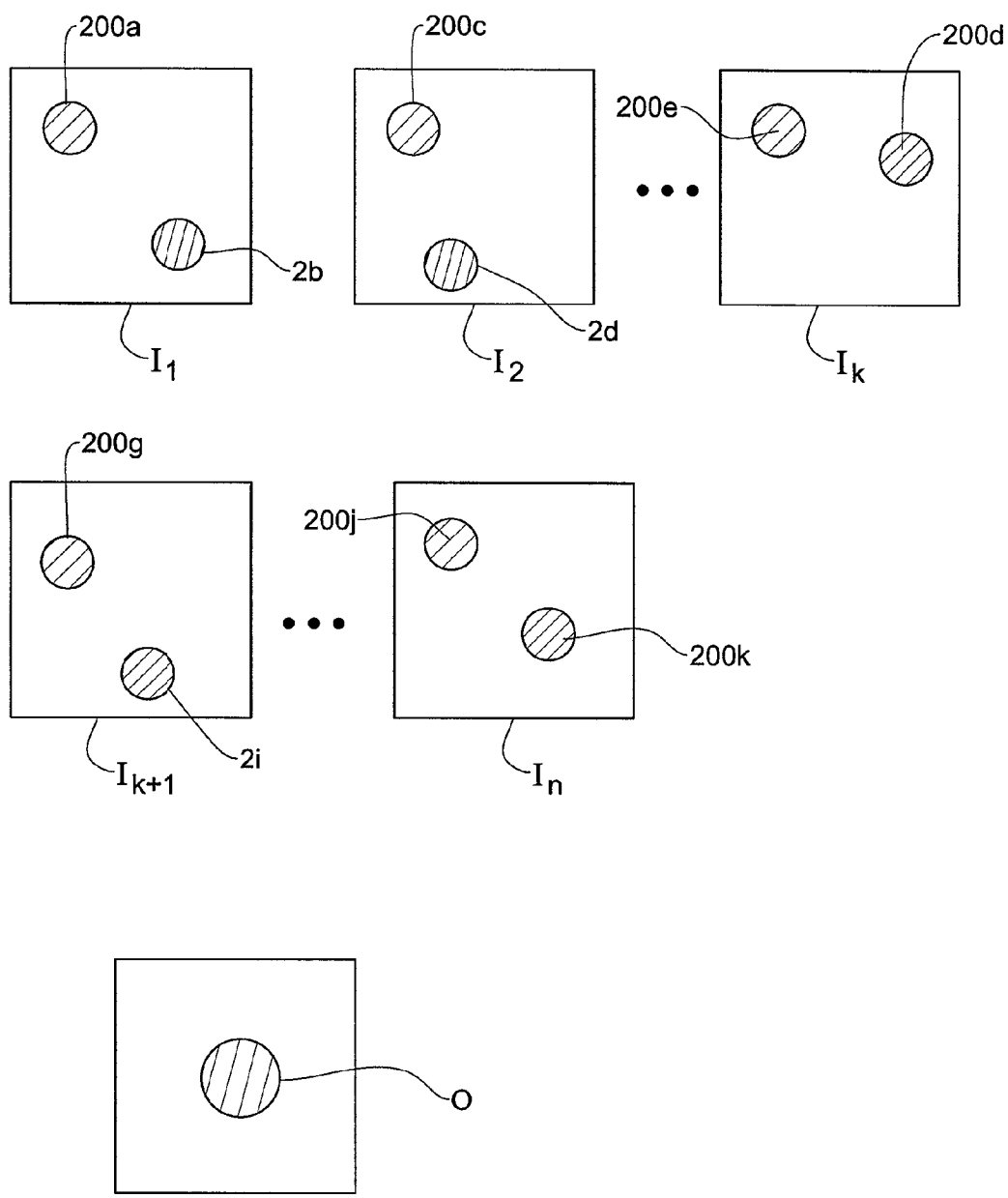
FIG. 18 shows a sequence of images after object detection.

When the predefined object has been detected in a sequence of images, the sequence of images may be subjected to a process of FIG. 18 shows a sequence of images $I_1, I_2, \ldots I_k, I_{k+1}, I_n$ in a video sequence. Each of the images $I_1$ to $I_n$ has been subjected to an object detection algorithm, which analyzed each image for the presence of one or more objects from a predefined list of objects. The predefined list of objects comprises a standard image for each of the objects on the list. In FIG. 18, a circle 200 in the images represents the location where the object recognition algorithm identified an object from the predefined list of objects. Some of the identified objects 200 may in fact be an object from the predefined list of objects. Some of the identified objects, however, may have been mistakenly identified by the objection detection algorithm as being from the predefined list of objects.

object validation is used to validate the objects 200 identified by the object recognition algorithm as being an image of an object from the predefined list of objects. In accordance with the invention, two or more sequences S of identified objects, $O_1, O_2, \ldots O_k, O_{k+1}, \ldots O_n$ are generated, where the object $O_k$ in a sequence S is an identified object 2 in the image $I_k$. An example of such a sequence would be the sequence of objects, 200a, 200c, ... 200f, 200g, ... 200j in FIG. 1. For each pair of consecutive objects $O_k, O_{k+1}$ in each sequence, a distance between the objects $O_k$ and $O_{k+1}, d_1(O_k, O_{k+1})$ is calculated using a first metric $d_1$. In addition, for each object $O_k$ in the sequence, a distance $d_2(O_k, O)$ is calculated between the object $O_k$ and the standard image O of the object which $O_k$ has been identified as (see FIG. 1 using a second metric $d_2$. The first and second metrics $d_1$ and $d_2$ may be the same metric or may be different metrics. For example, one or both of the first and second metrics may be a Euclidean metric or a Mahalanobis metric.

A length L is then calculated for each sequence S, the length of the sequence L(S) being given by $$L(S) = \sum_{k=1}^{n} (d_1(O_k, O_{k+1}) + d_2(O_k, O))$$

In one embodiment, sequences whose length is below a predefined length are identified as being composed of genuine objects, and the objects in such sequences are thus validated. Sequences whose length is above the predefined threshold are identified sequences containing one or more objects that were mistakenly identified by the object recognition algorithm as being the predefined object.

In another embodiment, a predefined fraction of shortest sequences, out of the total number of sequences are validated. For example, the smallest 10% of the sequences may be validated.

In one embodiment, the gesture recognition system is further configured to execute a facial image detection of a predefined person to locate a user's face in an image, and then to locate another body part of the user, such as a user's hand, in the image.

Figure 19:
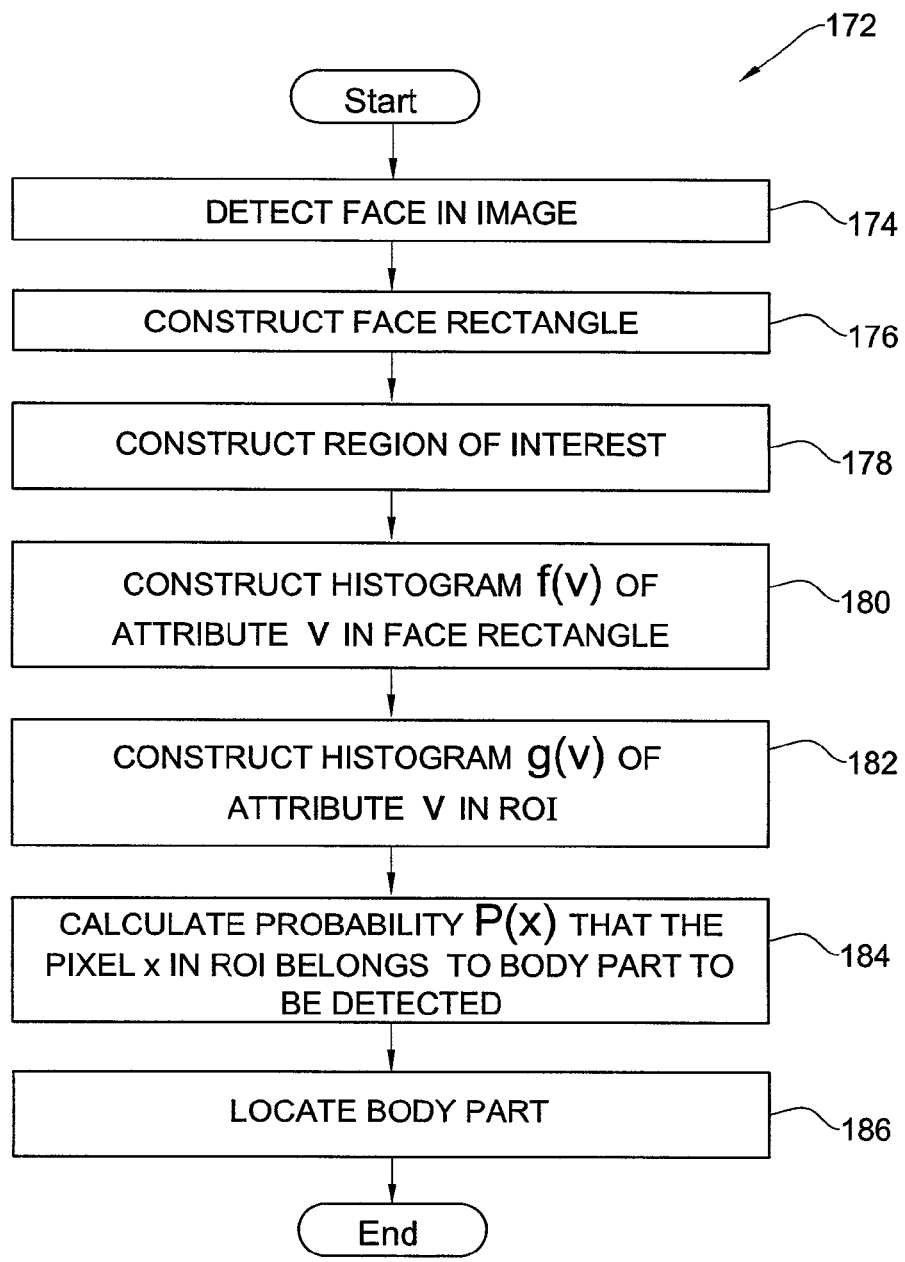
FIG. 19 shows a method for detecting a body part in an image.

FIG. 19 shows a process 172 for detecting a body part, such as a hand, in an image that may be executed by the gesture recognition module. In step 174 a face in the image is detected. This may be carried out, for example, using a Viola and Jones (VJ) method, for example, as disclosed in Viola, P et al, Robust Real-time Object Detection, Second International Workshop on Statistical and Computational theories of Vision-Modeling, learning, Computing, and Sampling, Vancouver Canada, Jul. 13, 2001. The face is specified by a face rectangle surrounding the face having edges parallel to the edges of the image and of minimal dimensions (step 76). A region of interest (ROI) in the image is then constructed where the body part to be detected is sought (step 178). The ROI, may be, for example, a rectangle whose center and dimensions are determined by a predefined transformation of face rectangle. For example, the center of the face rectangle may be offset from the center of the face rectangle by a predefined vector. The height and width of the ROI may be calculated, for example, as a first factor times the height of the face rectangle and a second factor times the width of the face rectangle, respectively.

Now, in step 180, a histogram f(v) of an attribute V of the pixels in the face rectangle is constructed, where f(v) is the frequency of the pixels in the face rectangle for which the value of the attribute V is v. Then in step 182, a histogram g(v) of the attribute V of the pixels in the ROI is constructed. In step 184, for each pixel x in the ROI, a probability P(x) of the pixel x belonging to the body part to be detected is calculated, wherein the calculation of the probability P(x) involves the value v(x) of the attribute V at the pixel x and the histograms f(v) and g(v). For example, P(x) may be proportional to f(v(x))/g(v(x)).

The process now proceeds to step 186 where the probabilities P(x) are used to locate the hand in the ROI. This may be done, for example, by identifying those pixels x having a probability P(x) above a predefined threshold as belonging to the hand.

The process then terminates.

The invention claimed is:

1. A device comprising:
at least one processor configured to:
receive input from at least one image sensor;
analyze images obtained by the at least one image sensor to detect at least one predefined gesture associated with at least a portion of a hand;
change a recognition mode of the device from a first recognition mode to a second recognition mode if a predefined condition is met, wherein the second recognition mode is associated with the first recognition mode, a detected gesture, and situational awareness information of the device, wherein the situational awareness information includes at least one of information related to a state of the device, information received by a sensor associated with the device, information related to one or more processes running on the device, information related to applications running on the device, information related to a power condition of the device, information related to a notification of the device, information related to movement of the device, information related to a spatial orientation of the device, information relating to an interaction with one or more users, information relating to user behavior, and information relating to one or more triggers; and generate a message based upon the first recognition mode and a detected gesture, wherein the first recognition mode differs from the second recognition mode by one or more of a capture rate of images obtained by the at least one image sensor or a resolution of images obtained by the at least one image sensor.

2. The device of claim 1, wherein the at least one processor is further configured to generate the message based, at least in part, on information from at least one system sensor.

3. The device of claim 2, wherein the at least one processor is further configured to detect the gesture based, at least in part, on analysis of system sensor signals.

4. The device of claim 3, wherein the at least one processor is further configured to define at least one of the first and second recognition modes based, at least in part, on predefined gestures to be detected, and one of the resolution of images obtained by the at least one image sensor, or the capture rate of images obtained by the at least one image sensor.

5. The device of claim 1, wherein the at least one processor is further configured to provide an indication that a gesture was recognized, the indication including at least one of a visual indication, an audio indication, a tactile indication, an ultrasonic indication, and a haptic indication.

6. The device of claim 5, wherein the at least one processor is further configured to provide the indication based, at least in part, on the situational awareness information.

7. The device of claim 6, wherein the situational awareness information is information related to at least one trigger, wherein the trigger includes at least one of a change in user interface of an application, a change in a visual appearance of an application, a change in mode of an application, a change in state of an application, an event occurring in software running on the device, a change in behavior of an application, a notification received via a network, an online service notification, a notification generated by the device or an application or by a service, from a touch on a touch screen, a pressing of a virtual or real button, a sound received by a microphone connected to the device, detection of a user holding the device, a signal from a proximity sensor, an incoming voice or video call via a cellular network, a wireless network, TCPIP, or a wired network, an incoming 3D video call, a text message notification, a notification of a meeting, a community network based communication, a Skype notification, a facebook notification, a twitter notification, an on-line service notification, a missed call notification, an email notification, a voice mail notification, a device notification, a beginning or an end of a song on a player, and a beginning or an end of a video.

8. The device of claim 1, wherein the situation awareness information relates to at least one trigger selected from a gesture, passing an object over the device at a distance less than a predefined distance, detection of a user looking at the device, detection of a face in an image obtained by the at least one image sensor, detection of one or more eyes in an image obtained by the at least one image sensor, detection of one or more hands or portions of a hand in an image obtained by the at least one image sensor, and detection of a predefined individual looking at the device.

9. The device of claim 1, wherein the situational awareness information is related to a state of the device, further wherein the message is addressed to the device, and further wherein the at least one processor is further configured to:

change a state of the device based, at least in part, on receipt of the message.

10. The device of claim 1, wherein the message is a command.

11. The device of claim 10, wherein the command includes at least one of a command to run an application on the device, a command to stop an application running on the device, a command to activate a service running on the device, and a command to stop a service running on the first device.

12. The device of claim 10, wherein the command provides an indication of at least one of an interface system that is ready to recognize gestures, an interface system that is ready to recognize one or more predefined gestures, and an interface system that is not ready to recognize gestures.

13. The device of claim 1, wherein the at least one processor is further configured to:

change the recognition mode of the device from the second recognition mode back to the first recognition mode after a predefined amount of time has elapsed.

14. The device of claim 1, further including at least one of an ultrasonic sensor, a proximity sensor, and an accelerometer.

15. The device of claim 1, wherein the message is a first message adapted for interpretation by a first running application on the device in a first manner, and wherein a second message is adapted for interpretation by a second running application on the device in a second manner.

16. A non-transitory computer-readable medium including instructions that, when executed by at least one processor, cause the processor to perform operations comprising:

receiving input from at least one image sensor;

analyzing images obtained by the at least one image sensor to detect at least one predefined gesture associated with at least a portion of a hand;

changing a recognition mode of the device from a first recognition mode to a second recognition mode if a predefined condition is met, wherein the second recognition mode is associated with the first recognition mode, a detected gesture, and situational awareness information of the device, wherein the situational awareness information includes at least one of information related to a state of the device, information received by a sensor associated with the device, information related to one or more processes running on the device, information related to applications running on the device, information related to a power condition of the device, information related to a notification of the device, information related to movement of the device, information related to a spatial orientation of the device, information relating to an interaction with one or more users, information relating to user behavior, and information relating to one or more triggers; and generating a message based upon the first recognition mode and a detected gesture, wherein the first recognition mode differs from the second recognition mode by one or more of a capture rate of images obtained by the at least one image sensor or a resolution of images obtained by the at least one image sensor.

17. The non-transitory computer-readable medium of claim 16, wherein the instructions, when executed by at least one processor, further cause the processor to perform at least one operation comprising:

generating the message based, at least in part, on information from at least one system sensor.

18. The non-transitory computer-readable medium of claim 17, wherein the instructions, when executed by at least one processor, further cause the processor to perform at least one operation comprising:
   detecting the gesture based, at least in part, on analysis of system sensor signals.

19. The non-transitory computer-readable medium of claim 18, wherein the instructions, when executed by at least one processor, further cause the processor to perform at least one operation comprising:
   defining at least one of the first and second recognition modes based, at least in part, on predefined gestures to be detected, and one of the resolution of images obtained by the at least one image sensor, or the capture rate of images obtained by the at least one image sensor.

20. The non-transitory computer-readable medium of claim 16, wherein the message is a command.

21. The non-transitory computer-readable medium of claim 20, wherein the command includes at least one of a command to run an application on the device, a command to stop an application running on the device, a command to activate a service running on the device, and a command to stop a service running on the first device.

22. The non-transitory computer-readable medium of claim 20, wherein the command provides an indication of at least one of an interface system that is ready to recognize gestures, an interface system that is ready to recognize one or more predefined gestures, and an interface system that is not ready to recognize gestures.

23. The non-transitory computer-readable medium of claim 16, wherein the instructions, when executed by at least one processor, further cause the processor to perform at least one operation comprising:
   changing the recognition mode of the device from the second recognition mode back to the first recognition mode after a predefined amount of time has elapsed.

24. The non-transitory computer-readable medium of claim 16, wherein the message is a first message adapted for interpretation by a first running application on the device in a first manner, and wherein a second message is adapted for interpretation by a second running application on the device in a second manner.

25. A gesture recognition method, comprising:
   receiving input from at least one image sensor;
   analyzing images obtained by the at least one image sensor to detect at least one predefined gesture associated with at least a portion of a hand;
   changing a recognition mode of the device from a first recognition mode to a second recognition mode if a predefined condition is met, wherein the second recognition mode is associated with the first recognition mode, a detected gesture, and situational awareness information of the device, wherein the situational awareness information includes at least one of information related to a state of the device, information received by a sensor associated with the device, information related to one or more processes running on the device, information related to applications running on the device, information related to a power condition of the device, information related to a notification of the device, information related to movement of the device, information related to a spatial orientation of the device, information relating to an interaction with one or more users, information relating to user behavior, and information relating to one or more triggers; and
   generating a message based upon the first recognition mode and a detected gesture,
   wherein the first recognition mode differs from the second recognition mode by one or more of a capture rate of images obtained by the at least one image sensor or a resolution of images obtained by the at least one image sensor.

* * * * *